United States Patent
Chehrazi et al.

(10) Patent No.: US 12,033,193 B2
(45) Date of Patent: Jul. 9, 2024

(54) MACHINE-LEARNING DRIVEN PRICING GUIDANCE

(71) Applicant: Nayya Health, Inc., New York, NY (US)

(72) Inventors: Sina Chehrazi, New York, NY (US); John Joseph Glorioso, Jr., Laurel, MD (US); Motaz Abdullah Balghonaim, Coquitlam (CA); Akash Magoon, Fallston, MD (US); Aman Magoon, Fallston, MD (US)

(73) Assignee: Nayya Health, Inc., New York, NY (US)

( * ) Notice: Subject to any disclaimer, the term of this patent is extended or adjusted under 35 U.S.C. 154(b) by 0 days.

(21) Appl. No.: 17/472,029

(22) Filed: Sep. 10, 2021

(65) Prior Publication Data

US 2022/0327584 A1 Oct. 13, 2022

Related U.S. Application Data

(60) Provisional application No. 63/174,160, filed on Apr. 13, 2021.

(51) Int. Cl.
*G06Q 30/0282* (2023.01)
*G06Q 30/0201* (2023.01)
(Continued)

(52) U.S. Cl.
CPC ..... *G06Q 30/0282* (2013.01); *G06Q 30/0205* (2013.01); *G06Q 30/0206* (2013.01); *G06Q 30/0283* (2013.01)

(58) Field of Classification Search
CPC ........... G06Q 30/0282; G06Q 30/0205; G06Q 30/0206; G06Q 30/02; G06Q 30/0283; G06Q 10/047; G06N 20/00; G01C 21/343
See application file for complete search history.

(56) References Cited

U.S. PATENT DOCUMENTS

| 7,305,347 B1 | 12/2007 | Joao |
| 7,711,660 B1 | 5/2010 | Gentile |

(Continued)

FOREIGN PATENT DOCUMENTS

| CN | 109545317 A | 3/2019 | |
| EP | 3401847 A1 * | 11/2018 | ......... G05B 19/0423 |

(Continued)

OTHER PUBLICATIONS

International Search Report and Written Opinion for PCT/US2022/023502 dated Jul. 15, 2022, 10 pages.

(Continued)

*Primary Examiner* — Mehmet Yesildag
*Assistant Examiner* — Thomas Yih Ho
(74) *Attorney, Agent, or Firm* — NovoTechIP International PLLC

(57) ABSTRACT

A data processing system for machine-learning driven price guidance implements obtaining location information indicative of a location associated with a user; obtaining prescription information for a first prescription and first cost prescription; obtaining, from one or more pharmacy benefits managers, prescription cost information for a prescription from a plurality of pharmacies; analyzing the prescription cost information, the location associated with the user, and the prescription information using a machine learning model to obtain a prescription cost information prediction indicating that a first subset of the plurality of pharmacies provide the prescription at a second prescription cost lower than the first prescription cost; providing the prescription cost information prediction to a pharmacy recommendation unit as an input; generating a prescription savings opportunity report that presents the prescription cost information; and causing a user interface of a display of a computing device to present the prescription savings opportunity report.

11 Claims, 17 Drawing Sheets

(51) Int. Cl.
*G06Q 30/0204* (2023.01)
*G06Q 30/0283* (2023.01)

(56) References Cited

U.S. PATENT DOCUMENTS

| | | | |
|---|---|---|---|
| 7,853,459 B2 | 12/2010 | Kay | |
| 8,185,463 B1 | 5/2012 | Ball | |
| 8,412,537 B1 | 4/2013 | Fenton | |
| 8,712,797 B1* | 4/2014 | Bezdek | G06Q 30/0239 |
| | | | 705/2 |
| 8,930,228 B1 | 1/2015 | Ball | |
| 9,183,593 B2 | 11/2015 | Willis et al. | |
| 9,495,700 B2 | 11/2016 | Hoch et al. | |
| 9,773,094 B1 | 9/2017 | Balagere | |
| 10,395,006 B2 | 8/2019 | Brown | |
| 10,402,908 B1 | 9/2019 | Ross et al. | |
| 10,803,528 B2 | 10/2020 | Mdeway | |
| 10,810,223 B2* | 10/2020 | Sundararaman | G16H 10/60 |
| 10,818,395 B1 | 10/2020 | Khalak et al. | |
| 11,113,770 B1 | 9/2021 | Magoon et al. | |
| 11,120,510 B1 | 9/2021 | Mitchell | |
| 11,170,450 B1 | 11/2021 | Magoon | |
| 11,244,370 B2* | 2/2022 | Ketchel, III | G16H 10/60 |
| 11,720,973 B2 | 8/2023 | Chehrazi et al. | |
| 2004/0111302 A1 | 6/2004 | Falk et al. | |
| 2005/0203828 A1 | 9/2005 | Lyakovetsky | |
| 2006/0173715 A1* | 8/2006 | Wang | A61B 5/0002 |
| | | | 600/300 |
| 2009/0281841 A1 | 11/2009 | Basak et al. | |
| 2009/0287509 A1 | 11/2009 | Basak et al. | |
| 2011/0046985 A1 | 2/2011 | Raheman | |
| 2013/0046624 A1* | 2/2013 | Calman | G06Q 30/0259 |
| | | | 705/26.8 |
| 2014/0278495 A1* | 9/2014 | Rourke | G16H 20/10 |
| | | | 705/2 |
| 2015/0006206 A1 | 1/2015 | Mdeway | |
| 2015/0046088 A1* | 2/2015 | Jang | G06Q 10/047 |
| | | | 701/538 |
| 2015/0142479 A1 | 5/2015 | Porter et al. | |
| 2016/0042148 A1* | 2/2016 | Bradley | G16H 70/40 |
| | | | 705/3 |
| 2017/0140114 A1 | 5/2017 | Are et al. | |
| 2018/0089379 A1 | 3/2018 | Collins et al. | |
| 2019/0005198 A1 | 1/2019 | Richards et al. | |
| 2019/0042887 A1* | 2/2019 | Nguyen | G06K 9/6257 |
| 2019/0080416 A1* | 3/2019 | Smith | G16H 50/70 |
| 2019/0266243 A1 | 8/2019 | Farooq | |
| 2019/0348180 A1 | 11/2019 | Sharifi Sedeh | |
| 2019/0384849 A1 | 12/2019 | Sundararaman | |
| 2020/0020038 A1 | 1/2020 | Haile et al. | |
| 2020/0043070 A1* | 2/2020 | Ketchel, III | G16H 10/60 |
| 2020/0096353 A1* | 3/2020 | Misaki | G01C 21/343 |
| 2020/0105392 A1* | 4/2020 | Karkazis | G16H 20/10 |
| 2020/0279025 A1* | 9/2020 | Owen | G06F 30/20 |
| 2020/0364797 A1 | 11/2020 | Halpern-Manners et al. | |
| 2020/0410601 A1* | 12/2020 | Laumeyer | G06F 40/174 |
| 2021/0035224 A1 | 2/2021 | Crabtree | |
| 2021/0035225 A1 | 2/2021 | Simpson et al. | |
| 2021/0065862 A1* | 3/2021 | Siegel | G06Q 30/0283 |
| 2021/0074401 A1* | 3/2021 | Bezdek | G06Q 40/08 |
| 2021/0103829 A1* | 4/2021 | Barshan | G06N 20/10 |
| 2021/0210185 A1* | 7/2021 | Allred | G16H 40/67 |
| 2021/0312515 A1* | 10/2021 | Ketchel, III | G06Q 30/0239 |
| 2022/0012766 A1* | 1/2022 | Hinton, II | G06Q 30/0201 |
| 2022/0019913 A1* | 1/2022 | Ayyadevara | G06N 5/04 |
| 2022/0094699 A1* | 3/2022 | Birur | H04L 63/107 |
| 2022/0101162 A1* | 3/2022 | Palacios | G06N 20/00 |
| 2022/0327585 A1 | 10/2022 | Magoon et al. | |
| 2022/0366474 A1 | 11/2022 | Kuhn | |
| 2023/0334590 A1 | 10/2023 | Chehrazi et al. | |
| 2023/0410211 A1 | 12/2023 | Chehrazi et al. | |

FOREIGN PATENT DOCUMENTS

| | | | |
|---|---|---|---|
| WO | 2005076957 A2 | 8/2002 | |
| WO | 2008057761 A2 | 5/2008 | |
| WO | WO-2014209517 A1 * | 12/2014 | G06Q 10/087 |
| WO | 2015024251 A1 | 2/2015 | |
| WO | 2016138102 A1 | 9/2016 | |
| WO | WO-2018156942 A1 * | 8/2018 | G06F 11/3495 |
| WO | WO-2018166853 A1 * | 9/2018 | G06F 17/16 |

OTHER PUBLICATIONS

Malhotra et al.; "Machine Learning in Insurance"; Accenture; 2018; pp. 1-13; located at https://www.accenture.com/_acnmedia/pdf-84/accenture-machine-leaning-insurance.pdf (Year: 2018).
International Search Report and Written Opinion for PCT/US2022/023512 dated Jul. 13, 2022, 10 pages.
Non-Final Office Action dated Feb. 4, 2022 in corresponding U.S. Appl. No. 17/472,167.
Final Office Action dated Jun. 1, 2023 in corresponding U.S. Appl. No. 17/472,167.
Non-Final Office Action dated Feb. 21, 2023 in corresponding U.S. Appl. No. 17/472,167.
Final Office Action dated Jul. 19, 2023 in corresponding U.S. Appl. No. 17/472,167.
Sahu et al.; "Automating claims adjudication workflows using Amazon Textract and Amazon Comprehend Medical"; AWS for Industries; Nov. 19, 2019; pp. 1-11; located at https://aws.amazon.com/blogs/industries/automating-claims-adjudic.ation-workflows-using-amazon-textract-and-amazon-comprehend-medical/.
Final Office Action dated Jun. 1, 2022 in corresponding U.S. Appl. No. 17/472,167.
International Search Report and Written Opinion for PCT/US2022/023499 dated Jul. 18, 2022, 11 pages.
Notice of Allowance dated Jun. 17, 2021 in corresponding U.S. Appl. No. 17/229,020.
Notice of Allowance dated Mar. 20, 2023 in corresponding U.S. Appl. No. 17/401,596.

* cited by examiner

AllInsurance

Please enter your login credentials.

Online ID
_____

Password
_____

Forgot password?

By selecting "Submit" you are agreeing to our Terms of Service.

Cancel   Submit

AllInsurance

Where would you like us to send your security code?

○ Text    XXX-XXX-5525

○ Email   tr......@gmail.com

[ Cancel ]    [ Continue ]

AllInsurance

Please verify the security code that was sent to XXX-XXX-5525:

6  1  3  3
___  ___  ___  ___

Cancel    Verify

Success

You can now access your policy information and claims for your AllInsurace policy.

[ Close ]

Insurance Dashboard

Welcome,
Anna
Member since 3/3/21

Today's Potential Savings
$247

Your Lifetime Savings
$127

The more actions you complete from the notifications below, the more you save!

---

Save up to
$123

<u>Anna</u> per year on your Tier I prescription drug Promethazine if you go to an alternative pharmacy nearby.

[ Save Now ]

---

Save up to
$247

<u>Jeff</u> by submitting your urgent care claim dated October 27, 2020 to Allied Insurance.

[ Save Now ]

---

Save up to
$110

<u>Jeff</u> per visit by changing to an in-network doctor for your recurring podiatry visits.

[ Save Now ]

---

Save up to
$55

<u>Anna</u> per visit by changing to an in-network doctor for your recurring orthopaedic specialist visits.

[ Save Now ]

[ Browse > ]

---

My Spending Overview

Medical
Total Deductible $6250     Deadline 12/14/2021
Total Deductible $1265.24     Remaining $4984.76
20%
You have not reached the deductible or out-of-pocket maximum.
View my medical plan

Pharmacy
Total Spent on Prescriptions $68.92     Total of Active Prescriptions 5
Find affordable prescriptions

Dental
Annual Benefit Limit $2500     Deductible $40 per person
Total Spend $2500 $400.57     Remaining $2459.43
25%
You have not reached the deductible or out-of-pocket maximum.
View my cards and plans

FIG. 6A

MACHINE-LEARNING DRIVEN PRICING GUIDANCE

CROSS-REFERENCE TO RELATED APPLICATIONS

This application claims the benefit of priority from U.S. Provisional Patent Application Ser. No. 63/174,160, filed on Apr. 13, 2021, and entitled "Machine-Learning Driven Pricing Guidance."

BACKGROUND

Price transparency for prescription drugs does not exist for most consumers. Prescription drug prices may vary significantly based on numerous factors, such as but not limited to the consumer's insurance plan, the pharmacy from which the consumer obtains the prescription, whether the drug is a generic or name-brand medication, when the purchase is being made, and other factors may impact the cost of prescription drugs. Hence, there is a need for improved systems and methods that provide a technical solution for solving the technical problem of analyzing prescription drug pricing data and providing guidance to consumers for reducing the costs of prescription drug prices.

SUMMARY

An example data processing system according to the disclosure may include a processor and a computer-readable medium storing executable instructions. The instructions when executed cause the processor to perform operations including obtaining policy coverage information for one or more insurance policies associated with a user; obtaining location information indicative of a location associated with the user; obtaining an electronic copy of prescription information for a first prescription that has been prescribed to the user, wherein the prescription information includes a first prescription cost associated with the first prescription; selecting one or more pharmacy benefits managers from which to obtain the prescription cost information based on the policy coverage information; obtaining, from the one or more pharmacy benefits managers, prescription cost information for a prescription from a plurality of pharmacies; providing the prescription cost information, the location associated with the user, and the prescription information to a machine learning model as an input; analyzing the prescription cost information, the location associated with the user, the policy coverage information, and the prescription information using the machine learning model to obtain a prescription cost information prediction, wherein the prediction indicates that a first subset of the plurality of pharmacies provide the prescription at a second prescription cost lower than the first prescription cost; providing the prescription cost information prediction output by the machine learning model to a pharmacy recommendation unit as an input; generating, using the pharmacy recommendation unit, a prescription savings opportunity report that presents the prescription cost information; and causing a user interface of a display of a computing device associated with the user to present the prescription savings opportunity report.

An example method implemented in a data processing system for machine-learning driven price guidance includes obtaining policy coverage information for one or more insurance policies associated with a user; obtaining location information indicative of a location associated with the user; obtaining an electronic copy of prescription information for a first prescription that has been prescribed to the user, wherein the prescription information includes a first prescription cost associated with the first prescription; selecting one or more pharmacy benefits managers from which to obtain the prescription cost information based on the policy coverage information; obtaining, from the one or more pharmacy benefits managers, prescription cost information for a prescription from a plurality of pharmacies; providing the prescription cost information, the location associated with the user, and the prescription information to a machine learning model as an input; analyzing the prescription cost information, the location associated with the user, the policy coverage information, and the prescription information using the machine learning model to obtain a prescription cost information prediction, wherein the prediction indicates that a first subset of the plurality of pharmacies provide the prescription at a second prescription cost lower than the first prescription cost; providing the prescription cost information prediction output by the machine learning model to a pharmacy recommendation unit as an input; generating, using the pharmacy recommendation unit, a prescription savings opportunity report that presents the prescription cost information; and causing a user interface of a display of a computing device associated with the user to present the prescription savings opportunity report.

An example machine-readable storage medium according to the disclosure on which are stored instructions which when executed cause a processor of a programmable device to perform operations of obtaining policy coverage information for one or more insurance policies associated with a user; obtaining location information indicative of a location associated with the user; obtaining an electronic copy of prescription information for a first prescription that has been prescribed to the user, wherein the prescription information includes a first prescription cost associated with the first prescription; selecting one or more pharmacy benefits managers from which to obtain the prescription cost information based on the policy coverage information; obtaining, from the one or more pharmacy benefits managers, prescription cost information for a prescription from a plurality of pharmacies; providing the prescription cost information, the location associated with the user, and the prescription information to a machine learning model as an input; analyzing the prescription cost information, the location associated with the user, the policy coverage information, and the prescription information using the machine learning model to obtain a prescription cost information prediction, wherein the prediction indicates that a first subset of the plurality of pharmacies provide the prescription at a second prescription cost lower than the first prescription cost; providing the prescription cost information prediction output by the machine learning model to a pharmacy recommendation unit as an input; generating, using the pharmacy recommendation unit, a prescription savings opportunity report that presents the prescription cost information; and causing a user interface of a display of a computing device associated with the user to present the prescription savings opportunity report.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C, 5D, 5E, 5F, 5G, and 5H show an example user interface for linking a CAAS account to an insurer account.

FIGS. 6A and 6B show an example user interface for presenting information for assisting a user for obtaining cost savings on prescriptions.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for machine-learning driven recommendations and reminders to an insured user for identifying pharmacies that may provide a prescription drug for a lower cost. The techniques provided herein can provide price transparency for prescription drugs that is typically unavailable to consumer. Prescription information for a user may be obtained in substantially real-time, and substantially real-time pricing for the prescriptions may be provided to the user based on the prescription information. A technical benefit of this approach is that the machine learning models may identify pharmacies near the user's location where the user can obtain their prescription drugs for a lower cost. This pricing information may not otherwise be evident to a user and/or may be overlooked by the user. As a result, the user may otherwise pay significantly more than necessary for their prescription drugs. Another technical benefit provided by the techniques described herein is that the machine learning models may be trained using data that has been parsed and standardized into a standard schema. Furthermore, the data to be analyzed by the machine learning models may also be parsed and standardized. As a result, the machine learning models are receiving data in a format that utilizes descriptions that are consistent with the training data used to train the models. Consequently, the predictions provided by the models may be significantly improved in comparison to models which are not trained using such a technique. The techniques provided herein also provide for substantially real-time analysis of information from a combination of data sources that may also significantly improve the predictions provided by the machine learning models and provide the user with more accurate pricing predictions. These and other technical benefits of the techniques disclosed herein will be evident from the discussion of the example implementations that follow. Furthermore, the techniques provided herein satisfy a long-felt need for providing price transparency for prescription drugs that allows consumer to make informed decisions when purchasing prescription drugs. Moreover, the solution provided to this problem is rooted in computer technology to overcome a problem arising in realm of computer systems for obtaining substantially real-time analysis and predictions from machine learning models.

Figure 1:
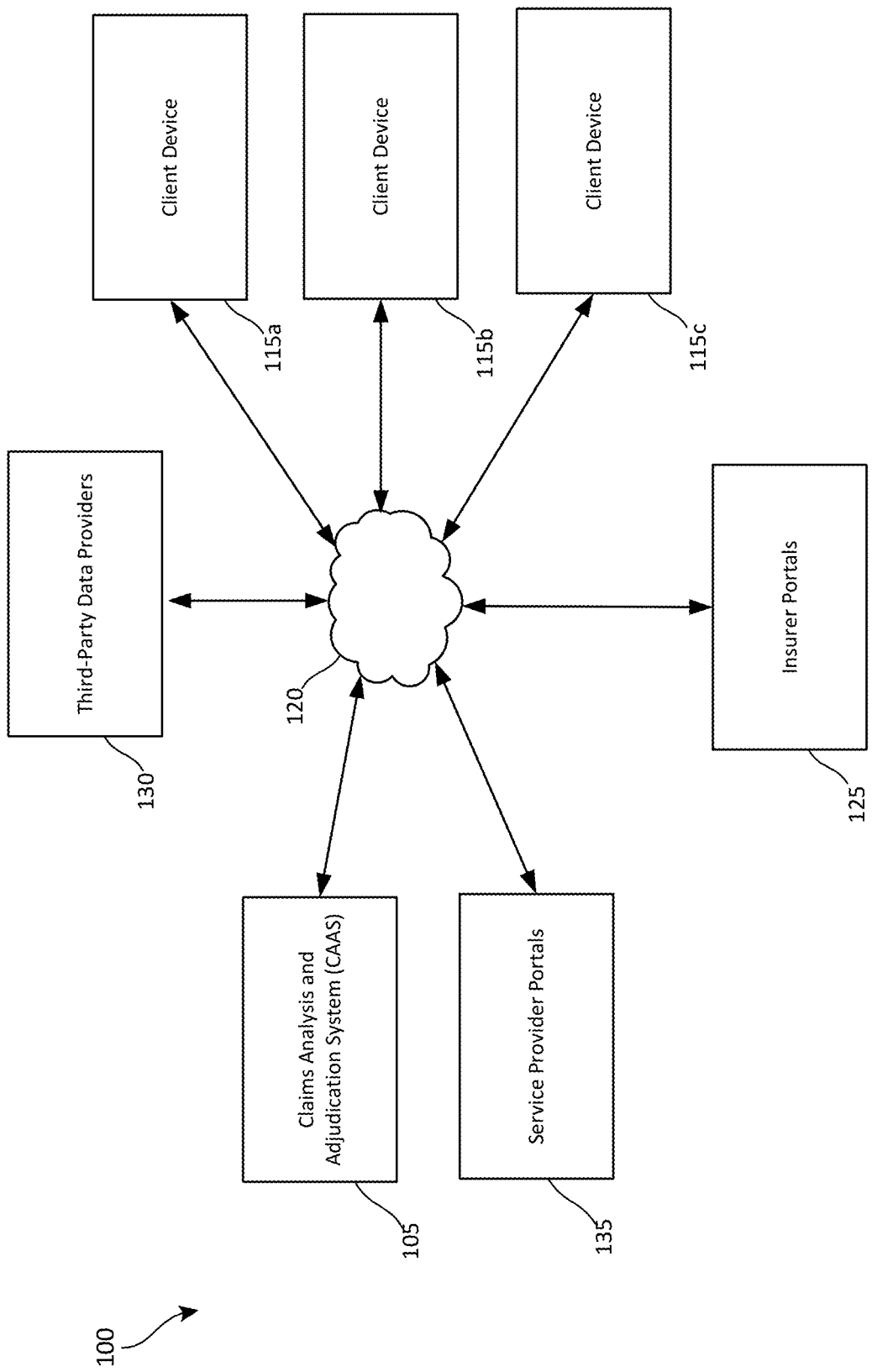
FIG. 1 is a diagram showing an example computing environment in which the techniques disclosed herein may be implemented.

FIG. 1 is a diagram showing an example computing environment 100 in which the techniques disclosed herein for insurance claims analysis and adjudication may be implemented. The computing environment 100 may include a claims analysis and adjudication system (CAAS) 105, one or more client devices 115, one or more insurer portals 125, one or more provider portals 135, and one or more third-party data providers 130. The example implementations shown in FIG. 1 include three client devices 115a, 115b, and 115c, but the techniques described herein may be used with a different number of client devices 115. The client devices 115a, 115b, and 115c may communicate with the CAAS 105, the insurer portals 125, service provider portals 135, and/or the third-party data providers via the network 120. The CAAS 105 may also communicate with the client devices 115a, 115b, and 115c, the insurer portals 125, the service provider portals 135, and/or the third-party data providers 130 via the network 120. The network 120 may include one or more wired and/or wireless public networks, private networks, or a combination thereof. The network 120 may be implemented at least in part by the Internet.

The client devices 115a, 115b, and 115c may be used by an insured to access the services provided by the CAAS 105, insurance information from the insurer portals 125, and/or information from the third-party data providers 130. The client devices 115a, 115b, and 115c are each a computing device that may be implemented as a portable electronic device, such as a mobile phone, a tablet computer, a laptop computer, a portable digital assistant device, a portable game console, and/or other such devices. The client devices 115a, 115b, and 115c may also be implemented in computing devices having other form factors, such as a desktop computer, vehicle onboard computing system, a kiosk, a point-of-sale system, a video game console, and/or other types of computing devices. While the example implementation illustrated in FIG. 1 includes three client devices, other implementations may include a different number of client devices. The client devices 115a, 115b, and 115c may be used to access the applications and/or services provided by the insurer portals 125 and/or the CAAS 105.

The insurer portals 125 may be supplied by insurance providers as a means for insured users to access their policy information, make policy payments, obtain new policies, to submit claims on existing policies, and/or perform other actions related to the managing the insured's insurance. An insured user may have policies with multiple insurers, and thus, may have to access multiple insurer portals 125 to obtain information related to each of their insurance policies. Consequently, the insured user must learn to navigate multiple insurance portals that may have significantly different layouts in order to access their policy information, submit claims and/or check on claim status, or perform other actions related to their policy.

The service provider portals 135 may provide a means for doctors, dentists, optometrists, and/or other medical professionals to submit claims to the insurers on behalf of an insured user. The service provider portals 135 may provide means for the providers to check on the status of a claim with an insurer. The service provider portals 135 may also permit the providers to amend and/or resubmit claims.

The CAAS 105 provides a cloud-based or network-based portal for accessing the services provided by the CAAS 105. The CAAS 105 may be configured to provide secure and delegated access to insurance claims for insured users. The CAAS 105 may implement a claims application programming interface (API) infrastructure that allows the insured users to access their insurance claims data and to provide various services such as claims analysis and adjudication services, guidance for optimizing prescription benefits, guidance for optimizing medical spending account (MSA) usage, guidance for proactive benefits engagement, services which may assist the insured in selecting a bundle of insurance products that satisfies the insured requirements, and/or other services related to optimizing the insurance coverage and utilization by the insured. Among the services provided by the CAAS 105, the CAAS 105 provides substantially real-time claims analysis and adjudication. The CAAS 105 may utilize a machine-learning model or models trained to analyze the claims to guide the user through submitting the claims to the appropriate insurer and to provide other advice for optimizing the use of the coverage provided to the user by their policies. The CAAS 105 may also respond to changes in the demographic data of the user and may provide a proposed bundle of insurance policies that meet the changing needs of the user. The example implementations which follow provide additional details describing these and other features of the CAAS 105.

The CAAS 105 may be configured to collect policy and claims information for users from the insurer portals 125, to analyze the information included in the policy information to obtain coverage information. The coverage information may include which types of claims are covered by each policy, the limits of coverage provided by each policy, other information that may be used to determine whether an insurer may cover a particular claim, or a combination thereof. The CAAS 105 may be configured to implement a set of secure and authenticated pipelines that are configured to allow members to link to their accounts with their insurance providers to obtain plan information, claims information, or both. The CAAS 105 may provide a user interface that provides a list of supported insurers. The user may select an insurer from the list of supported insurers and the user interface guides the user through setting up the connection with the user's account with that insurer. The user may securely provide authentication details that permit the CAAS 105 to securely access the policy information and/or claims information provided through the insurer portals 125. The CAAS 105 may access the policy information, claims information, or both, analyze this information, and convert the information to a unified and standardized schema for this information. The standardized information may be stored by the CAAS 105 to provide various services to user, which will be discussed in greater detail with respect to the example implementation of the CAAS 105 shown in FIGS. 2 and 3.

The third-party data providers 130 are additional data sources that may be accessed by the CAAS 105 to obtain additional information for a user. The CAAS 105 may be configured to use the third-party data to supplement information collected from the user. The CAAS 105 may be configured to collect at least some demographic information from the user by presenting a set of dynamically generated questions to the user. The questions presented to the user may be dynamically selected based at least in part on the user's responses to previous questions, to information included in the third-party data, or a combination thereof. The third-party information and/or information that may be collected from the user may include, but is not limited to, the user's medical history, past insurance consumption, the user's financial profile (debts, assets, liabilities), credit history, family information, psychographics, interests, occupation, salary, physical activity, and other information that may be used by the CAAS 105 to facilitate providing insurance plan recommendations to the user. The CAAS 105 may query the third-party data providers 130 for information and may reformat the data into a standard schema used by the CAAS 105 for storing and analyzing the data. The CAAS 105 may also be configured to disambiguate the data received from the third-party data sources where the data includes information associated with multiple people who may or may not be the user. Additional details of data disambiguation are provided in the examples which follow.

Figure 5A:
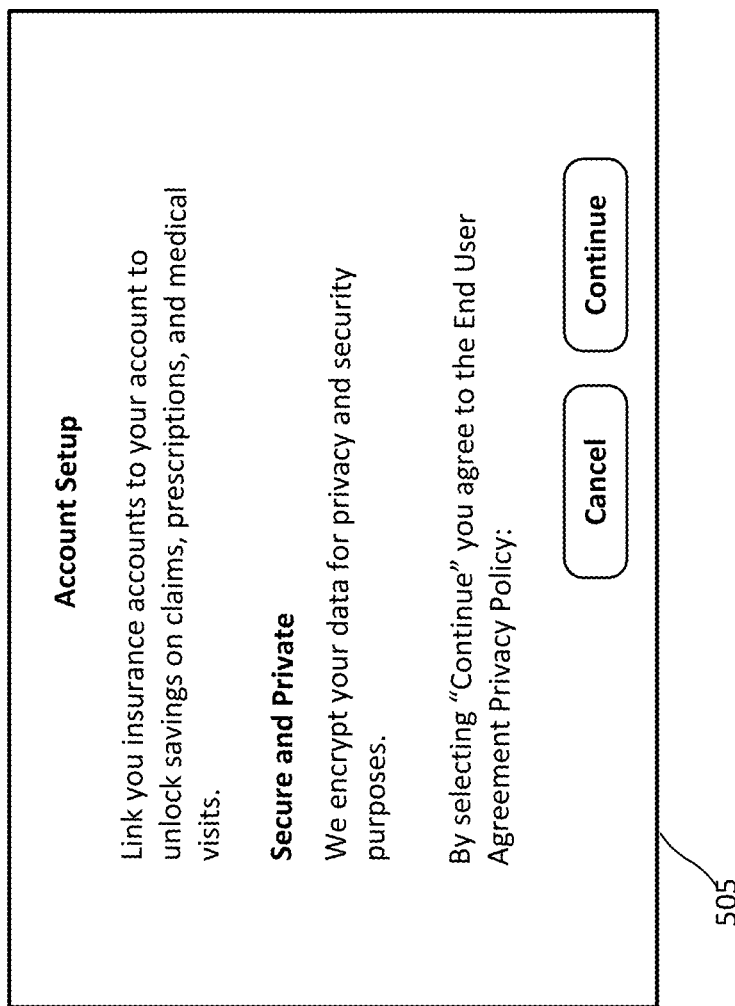
Figure 5B:
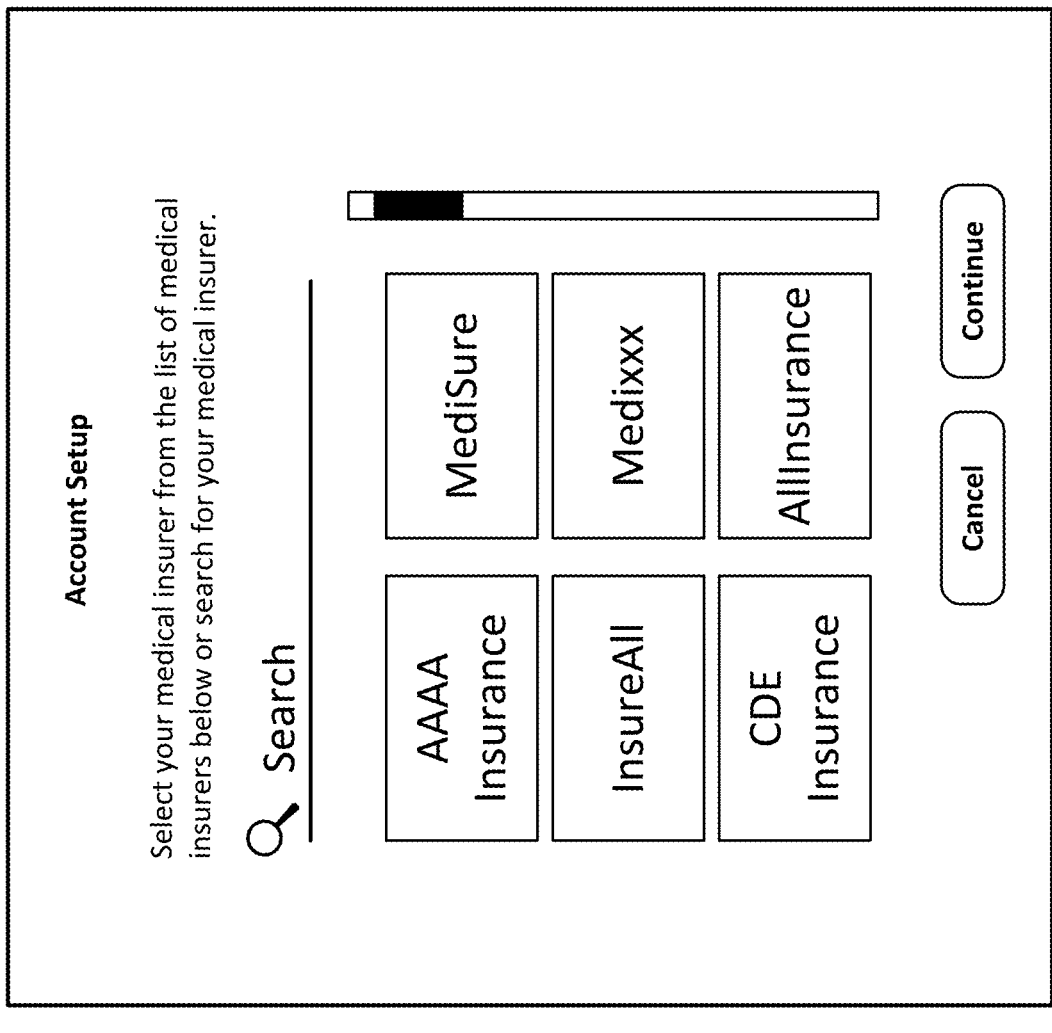
Figure 5C:
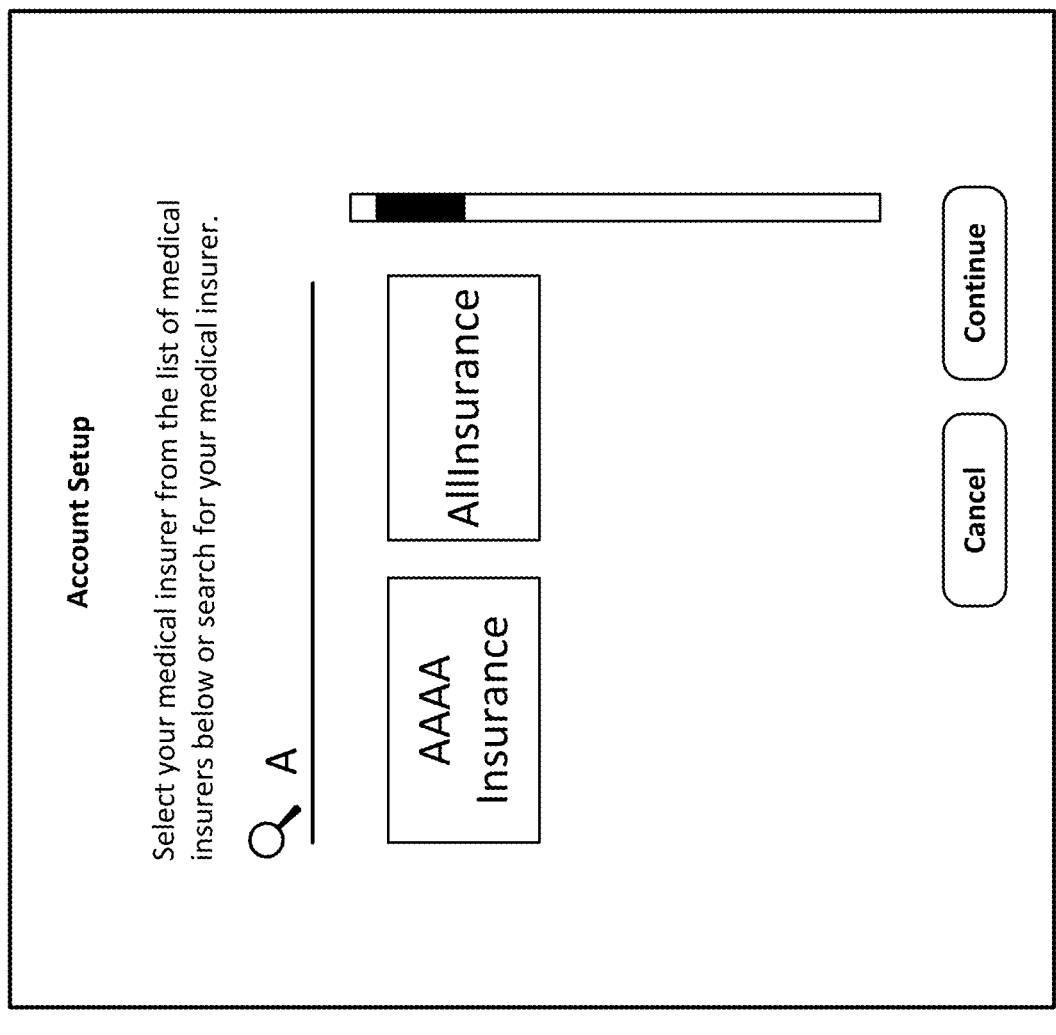
Figure 5D:
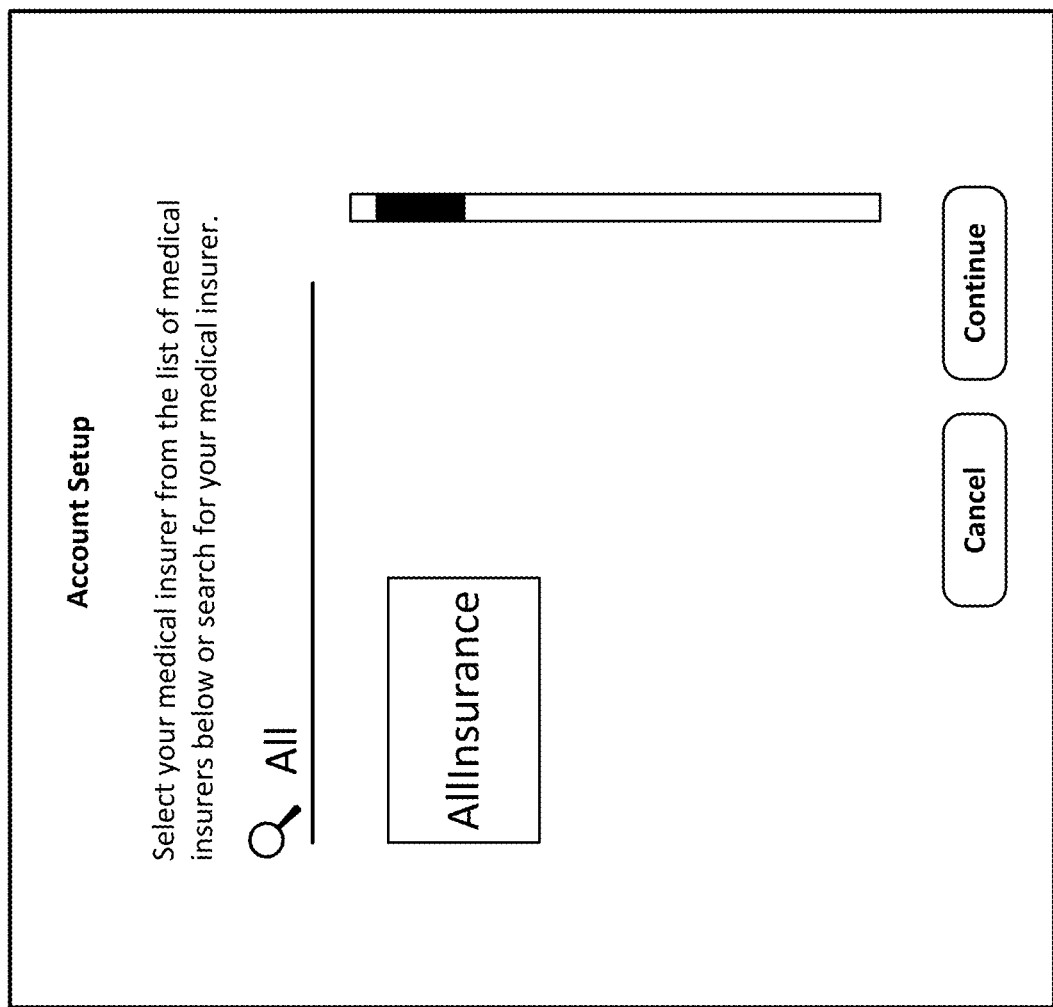

FIGS. 5A-5H show an example of the CAAS 105 guiding a user through the process of linking the user's account with an insurer to the user's CAAS account so that the CAAS 105 may obtain policy and claim information associated with the user from the insurer portal 125. FIG. 5A shows a user interface 505 for starting the setup process that presents information to the user regarding the account setup process. The user may click on the "Continue" button to cause the CAAS 105 to advance to the user interface 510 shown in FIG. 5B. The user interface 510 provides a list of insurers to which the CAAS 105 has been configured to permit the user to link the CAAS account to the user's account on the insurer's system. The user may select the icon associated with a particular insurer or type the name of the insurer in the search field. FIGS. 5C and 5D show that the list of insurers may be narrowed dynamically as the user types in the search field. FIG. 5E shows an example of a user interface 515 that may be displayed for the selected insurer. The user may provide their authentication credentials for the insurer portal and click submit. The CAAS 105 will attempt to access the insurer portal 125 using the provided authentication criteria. FIGS. 5F and 5G show an example two-factor authentication user interface 520 that may be used to further secure access to the user account on the insurer portal 125. Once the user has been authenticated with the insurer's portal, the user interface 525 may be displayed to confirm that the accounts have been linked. The CAAS 105 may then access claims information, policy information, and/or other information from the insurer portal 125.

Figure 2:
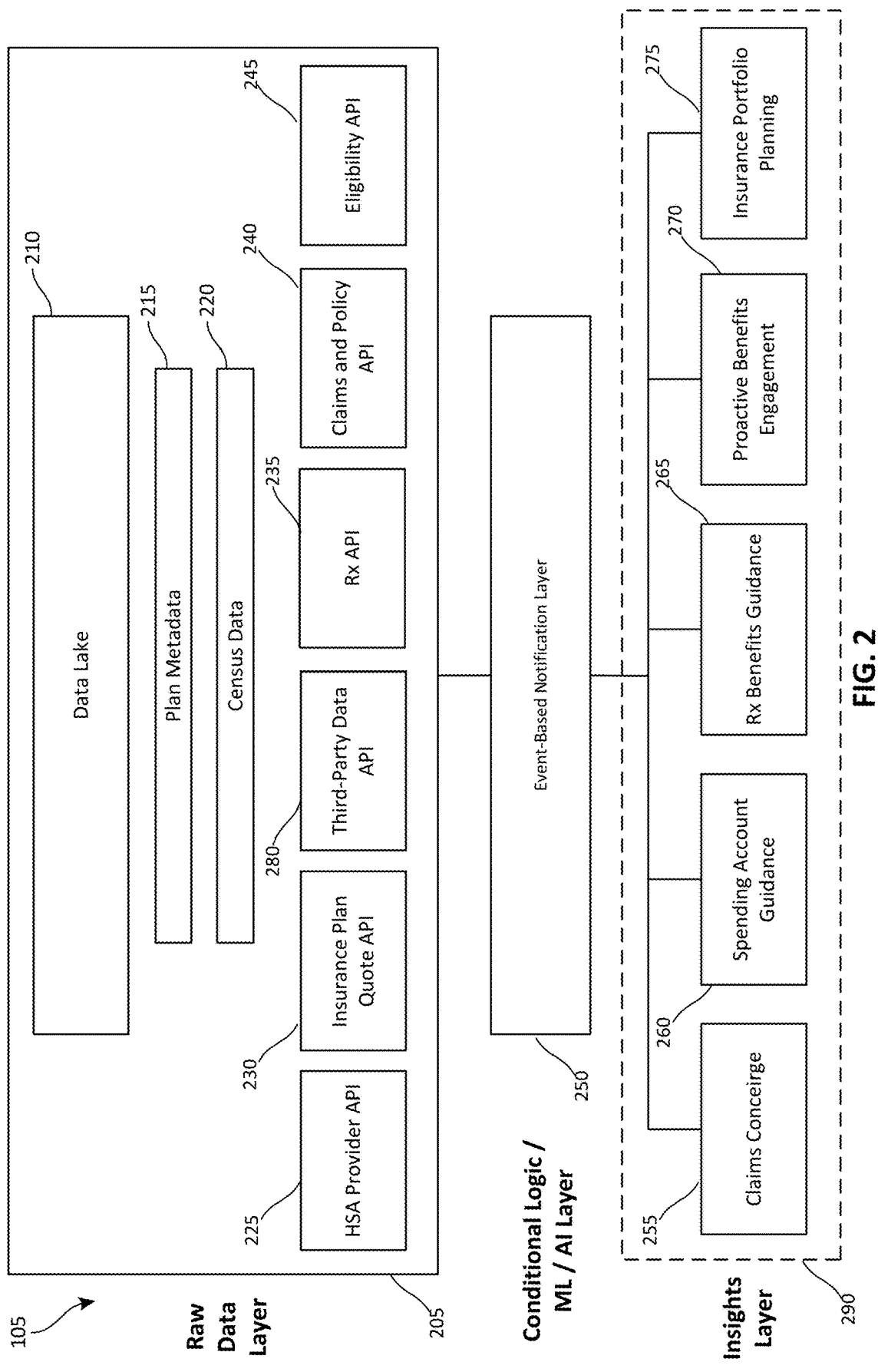
FIG. 2 is a diagram of an example architecture that may be used, at least in part, to implement the claims analysis and adjudication system (CAAS) shown in FIG. 1.

FIG. 2 is a diagram of an example implementation of a CAAS 105 shown in FIG. 1 that shows additional elements of the CAAS 105. The CAAS 105 shown in FIG. 2 includes three layers: (1) a raw data layer 205, (2) an event-based notification layer 250, and (3) an insights layer 290. The raw data layer 205 may be configured to obtain insurance data for users from various data sources, to convert this data to a unified and standardized schema, and to store the user data for analysis by the event-based notification layer 250 and/or the insights layer 290 to provide various insurance-related services to the users. Additional details of the functions of each of these layers will be described in greater detail in the examples which follow. In some implementations, the functions of each of these layers may be grouped together into a different number of functional layers. Furthermore, the functionality of each of the layers may be implemented on separate servers in some implementations, and the servers may be communicably coupled over public and/or private network connections to permit the various components of the CAAS 105 to exchange and analyze data.

The raw data layer 205 may include a data lake 210, a plan metadata data store 215, a census data datastore 220, a health savings account (HSA) provider API 225, an insurance plan quote API 230, a prescription API 235, a claims and policy API 240, an eligibility API 245, and a third-party data API 280. The APIs provide pipelines for obtaining data that that the CAAS 105 may use to provide various insurance-related services. User data may be protected by secure and authenticated pipelines when accessing sensitive data. The CAAS 105 may guide a user through setting up authentication with the external data sources to allow the CAAS 105 to securely access the user data.

Figure 3:
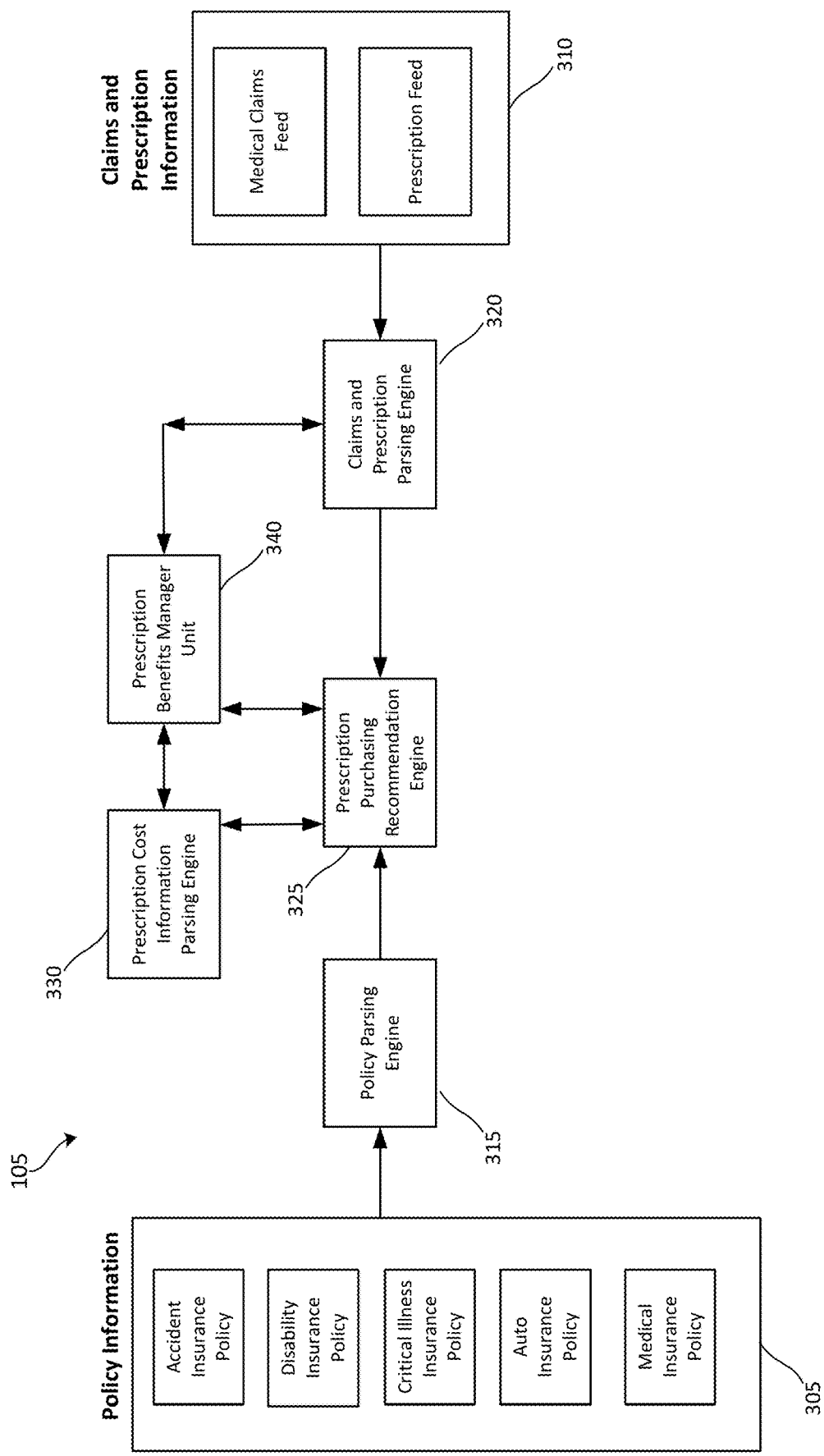
FIG. 3 is a diagram of an example architecture that shows additional details of a CAAS which may be used to implement the CAAS shown in FIGS. 1 and 2.

The data lake 210 may be used to store raw user data, raw claims data, and raw policy data that has been obtained from one or more external data sources, such as but not limited to the insurer portals 125 and the third-party data providers 130. Raw data, as used herein, refers to an original data format in which the data was obtained from the external data source. The format of the raw data may depend on the type of data and the external data source from which the data was obtained. The raw data may be retained in the data lake 210, and the raw data in 210 may be processed into a standard schema by one or more parsing engines of the CAAS 105. The standard schema defines a set of logical data structures that may be used by the CAAS 105 storing and analyzing data. FIG. 3, which will be discussed in greater detail below, includes three parsing engines, a policy parsing engine 315, a claims and prescription parsing engine 320, and a prescription cost information parsing engine 330 for parsing data. While the example shown in FIG. 3 includes three separate parsing engines, the functionality of the parsing engines may be combined into a single parsing engine or into a different number of parsing engines than those shown in FIG. 3. The standardized policy data may be stored in the plan metadata 215.

The policy data may include coverage information, including but not limited to the types of claims are covered by each policy, the limits of coverage provided by each policy, other information that may be used to determine whether an insurer may cover a particular claim for a user. The census data 220 may include demographic information that is collected from the user by the CAAS 105, information about the user obtained from third-party data providers 130, information obtained from the insurer portals 125, and/or other information about the users that may be used by the CAAS 105 to provide recommendations to the user regarding insurance-related issues. The user-related data obtained from these various sources may be formatted into a standard schema by one or more parsing engines of the CAAS 105 and stored in the census data 220.

The raw data layer 205 shown in FIG. 2 includes six API units configured to implemented APIs for accessing data from various sources. Some implementations of the raw data layer 205 of the CAAS 105 may include a different number of APIs for accessing data from the various data sources. The types of data sources accessed and processed by the raw data layer may depend at least in part on the functionality provided by the insights layer 290 discussed in greater detail in the examples which follow.

The claims and policy API 240 is configured to obtain policy information and/or insurance claims information from insurers via the insurer portals 125. As discussed in the preceding examples, the CAAS 105 may be configured to provider a user interface that guides the user through linking their account with the CAAS 105 to their accounts with their insurers. The claims and policy API 240 may be configured to retrieve policy information and/or claims information from each insurer and store the raw data in the data lake 210. The insurance policy information may be converted to the standard schema by the policy parsing engine 315 and the claims information may be converted to a standard schema by the claims and prescriptions parsing engine 320 shown in FIG. 3.

The policy information for users may be kept up to date in substantially real-time. The claims and policy API 240 may be configured to periodically check for updates to the policy information for users. The claims and policy API 240 may also check for updates to the policy information for the user in response to a request from the event-based notification layer 250 or the insights layer 290. In some implementations, the claims and policy API 240 may receive updates to the claims information and/or the policy information from the insurer in response to the changes or renewal of a policy or in response to claims being submitted to the insurer for reimbursement.

The HSA provider API 225 may be configured to obtain information from one or more HSA providers. The HSA provider API 225 can obtain information associated with the HSA account of a user, such as but not limited to the current balance, historical reimbursement information for claims reimbursed by the HSA account, and/or other information associated with the usage of the HSA account. The HSA information may be used by the CAAS 105 to build a historical model of the number and types of claims submitted for reimbursement by the user and to make predictions for recommended future funding of the HSA based on the historical usage. The HSA information may be obtained by the HSA provider API 225 may be stored in data lake 210. The HSA information may be converted to the standard schema by a parsing engine. The HSA account information may also be considered by the CAAS 105 when analyzing the insurance coverage of the user and for recommending coverage that accommodates the needs of the user. While the examples discussed herein discuss the use of HSAs, the HSA provider API 225 may also be configured to obtain information for flexible spending accounts (FSAs) as well. FSAs are another type of spending account that are typically associated with an employer. FSAs may have different eligibility criteria for enrollment and different contribution limits than HSAs. Furthermore, unused funds in an FSA may be forfeited at the end of the calendar year while unused funds in an HSA typically may roll over to the next year.

The prescription API 235 may be configured to obtain prescription price information from a pharmacy benefits manager (PBM). PBMs are entities that assist payers, such as government entities, such as but not limited to Medicare and Medicaid, and/or insurance companies to develop and/or maintain formularies of prescription drugs that are reimbursable by the government entity or insurer. A formulary is a list of drugs that are approved by reimbursement by a payer. The formulary may include information indicating how much the payer will reimburse for a particular prescription drug, copays that the insured user would be responsible for paying to obtain that drug, and/or other information associated with the A formulary may be developed by the PBM and may be adopted or customized by a payer. Some payers may also develop their own formularies. The PBM or insurer may update their formularies periodically upon the advice of Pharmacy and Therapeutics (P&T) committees who assess which drugs are deemed to be the most clinically appropriate for a certain drug class and indication change over time. The PBM may negotiate the cost of prescription drugs on the formularies with pharmaceutical manufacturers and/or wholesalers to obtain rebates and/or other concessions on the costs of the prescription drugs. The PBM may also negotiate with pharmacies regarding drug dispensing fees and/or administrative fees to pharmacies that fill prescriptions for insured customers of the PBM's payer clients. The PBM may be responsible for reimbursing pharmacies for the cost of the prescription drugs covered by the one PBM's payer clients, and the insured customer would only be responsible for paying an copays to the pharmacy.

The prescription API 235 may be configured to obtain prescription drug price information from a PBM or PBMs for an insured user. Information regarding the prescriptions that a user has been prescribed may be obtained directly from the user and/or determined based on the claims information obtained from the insurance providers via the claims and policy API 240. The prescription price information may be utilized by the prescription benefits guidance unit 265 in addition to information obtained from PBMs to provide guidance to the user for obtaining their prescription medications at a lower cost if possible.

The insurance plan quote API 230 may be configured to obtain quotes for insurance coverage from insurers that may be used by the CAAS 105 to create a comprehensive bundle of insurance policies for a user based at least in part on predicted insurance consumption by the user. The insurance plan quote API 230 may be configured to submit requests for quotes to insurers for medical insurance, dental insurance, accident insurance, hospital indemnity insurance, auto insurance, and/or other types of insurance. The insurance portfolio planning unit 275 may use the quote information to build a comprehensive insurance plan for the user that is based on the needs of the user. The insurance portfolio planning unit 275 may determine the needs of the user based on user data that includes, but is not limited to, the user's medical history, past insurance consumption, the user's financial profile (debts, assets, liabilities), family information, psychographics, interests, occupation, salary, physical activity, and/or other information that may be used to infer the needs of the user.

The eligibility API 245 may be configured to verify enrollment of a user with an insurer. The API 245 may be used to determine whether the user is covered by a particular policy and whether the user is eligible for certain types of claims to be reimbursed by the insurer. The eligibility information may be utilized by the CAAS 105 to determine whether a particular claim or type of claims may be covered by a particular insurer. The eligibility information may be accessed substantially in real-time so that recommendations provided by the CAAS 105 are based on current enrollment status of the user.

The third-party data API 280 may be configured to submit queries for third-party data to the third-party data provider 130. The third-party data sources may include but are not limited to sources of medical history data, financial profile information, credit history information, marital status information and/or family information, occupation, salary, and/or other information that may be used by the CAAS 105 to provide various recommendations to the user. The third-party data API 280 may also be configured to submit queries to PBMs to obtain coverage and pricing information for prescription drugs. The third-party data API 280 may submit queries for prescription drugs within a specific geographical area to obtain pricing information for that drug from multiple pharmacies, and the CAAS 105 may use this information to guide the user through obtaining their prescription medications at a lower cost when possible. The third-party data API 280 may be used by the various components of the CAAS 105 to query the various data sources for third party data related to the user and/or for prescription drug information.

The event-based notification layer 250 may utilize conditional logic, machine learning models, and/or artificial intelligence systems for analyzing the data obtained and/or generated by the raw data layer 205. The event-based notification layer 250 may be configured to analyze the data from the raw data layer 205 to support the functionality of the services provided by the insights layer 290. The event-based notification layer 250 may utilize one or more machine learning models to analyze the data maintained by the raw data layer 205. The event-based notification layer 250 may implement elements of the prescription purchasing recommendation engine 325 shown in FIGS. 3 and 4.

The insights layer 290 may provide various services to the user based on the analysis of the data by the event-based notification layer 250. The insights layer 290 includes a claims concierge unit 255, a spending account guidance unit 260, a prescription benefits guidance unit 265, a proactive benefits engagement unit 270, and an insurance portfolio planning unit 275.

The claims concierge unit 255 may be configured to analyze claims data and to provide recommendations to the user for submitting the claims to an insurer. The claims concierge unit 255 may be configured to automatically analyze claims data to identify claims that may be paid by an insurer. The claims concierge unit 255 may also provide recommendations in response to a request from a user to analyze one or more pending insurance claims.

The spending account guidance unit 260 may provide guidance to the user for optimizing the funding of the MSA based on prior health plan consumption and utilizing the MSA funds to reimburse medical claims costs. The prescription benefits guidance unit 265 may provide guidance to the user for providing prescription price guidance to the user including prices at which prescriptions medications are being offered at pharmacies located near the user. The prescription price information obtained by the prescription API 235 may be utilized by the prescription benefits guidance unit 265 in addition to information obtained from PBMs via the third-party data API 280 to provide guidance to the user for obtaining their prescription medications at a lower cost if possible.

The proactive benefits engagement unit 270 may provide recommendations to the user for optimizing the usage of their benefits. The proactive benefits engagement unit 270 may be configured to provide meaningful and actionable notifications to encourage users to engage with the benefits provided by their insurance policies. The proactive benefits engagement unit 270 may consider the personal finances of the user and other factors when making recommendations to the user regarding the usage of the user's benefits. Additional features of the proactive benefits engagement unit 270 are provided in the examples which follow.

The insurance portfolio planning unit 275 may provide recommendations to the user for building insurance bundles that consider the user's demographics, risk aversion of the user, and the needs of the user.

FIG. 3 is a diagram that shows an example implementation of a prescription purchasing recommendation engine 325 that may be implemented by the CAAS 105. The prescription purchasing recommendation engine 325 may be configured to provide machine-learning driven recommendations for assisting the user in identifying low-cost or lower-cost options for obtaining their prescriptions. Additional details of the services provided by the prescription purchasing recommendation engine 325 are provided in the examples which follow. The prescription purchasing recommendation engine 325 may be implemented in part by elements of the raw data layer 205, the event-based notification layer 250, and the insights layer 290 shown in FIG. 2. For example, the prescription benefits guidance unit 265 may implement at least a portion of the functionality of the prescription purchasing recommendation engine 325 described herein.

The policy information 305 may include multiple insurance policies, such as but not limited to medical insurance policies, dental insurance policies, accident insurance policies, disability insurance policies, critical illness insurance policies, auto insurance policies, and/or other types of insurance policies. One or more of these policies may provide prescription coverage. The prescription purchasing recommendation engine 325 may use the policy information to predict which policies may provide the user with low-cost or lower-cost coverage for their prescriptions. The policy information 305 may provide current insurance coverage of a user and information for past claims that were previously made against insurance the user's insurance policies. The past claim information may be used by the prescription purchasing recommendation engine 325 to predict future claims consumption, including prescriptions, by the user based upon a demographic cluster into which the user is predicted to fall. The predicted consumption information may be used by the insurance portfolio planning unit 275 to generate a recommended comprehensive insurance plan for the user that includes a bundle of insurance policies. The past claim information may also be used to identify claims associated with out-of-network providers and to provide recommendations to the user to reduce medical spending by suggesting in-network providers that may be utilized in the future. Furthermore, the claim information may be used to provide recommendations to the user for obtaining lower cost prescriptions from pharmacies located proximate to the user. The prescription purchasing recommendation engine 325 may obtain prescription pricing information for predicted prescriptions and/or prescriptions that have been prescribed to the user via the prescription feed discussed below.

The policy information 305 may be obtained by the claims and policy API 240 of the raw data layer 205 shown in FIG. 2. Electronic copies of the policies may be obtained from the insurers in a Portable Document Format (PDF), or another electronic format supported by each insurer. Insurers may support different electronic file formats and the layout of the policy information provided by each insurer may vary. The policy information obtained from the insurers may be stored in the data lake 210 of the raw data layer 205. The policy parsing engine 315 may be configured to analyze the raw policy data obtained from the insurers and to convert the policy information to the standard schema. The standardized information may be stored in the plan metadata 215. The plan metadata may include coverage information, policy limits, deductible information, claims information, and/or other information that may be used by the CAAS 105 to determine whether a particular insurer may reimburse the policy holder for a particular type of claim or claims. The policy information may also be used by the prescription purchasing recommendation engine 325 to provide guidance to the user in utilizing their available benefits and for potentially realizing cost savings for their prescription medications.

The policy parsing engine 315 may be configured to use fuzzy matching techniques to map policy coverage information extracted from the insurance policies to standardized coverage information. Insurers may use slightly different language to describe the coverage provided. The policy parsing engine 315 may be configured to map the policy coverage information with a set of standardized insurance coverage descriptions maintained by the CAAS 105. The standardized insurance coverage descriptions may include descriptions of types of coverage that may be offered by insurers. The policy parsing engine 315 may be configured to perform a probabilistic data match on the coverage information provided in an insurance policy with the standardized coverages descriptions. The policy parsing engine 315 may be configured to select a standardized description that is associated with the highest probability of being a match with the policy coverage description. The matching standardized description may be stored with the policy information in the plan metadata 215 and may be used by the prescription purchasing recommendation engine 325 to determine coverage limits, copays and other patient responsibility amounts, out-of-network related costs, and/or other information that may be used to provide recommendations to user to assist them in more fully utilizing the benefits available to them. The plan metadata 215 may also include information for preventative care information and/or other benefits that may be no cost or low-cost benefits provided by the insurance policy, such as but not limited to periodic physical health examinations, periodic dental examinations and cleanings, and discounts of health club memberships.

Mapping the policy coverage information to standard descriptions may provide a significant technical benefit by improving the predictions that are provided by the machine learning models used by the prescription purchasing recommendation engine 325. The machine learning models may be trained using training data that includes the same standard insurance coverage descriptions that will be used by the prescription purchasing recommendation engine 325, in addition to additional information, for predicting cost savings on prescription medications by recommending pharmacies that provide the prescriptions at lower costs in a geographical area near the user. Thus, the machine learning models may be presented policy coverage data for analysis that utilizes descriptions consistent with the coverage descriptions included in the training data used to train the model.

The claims and prescription information 310 may include substantially real-time information from a medical claims feed and prescription feed. The medical claims information represents insurance claims that the user has submitted or has had submitted on their behalf for reimbursement. The prescription information represents prescriptions that have been prescribed to the user and may be submitted for reimbursement to an insurer. The prescription information may be used by the prescription purchasing recommendation engine 325 to provide recommendations for pharmacies located near the user that may provide the prescription at a lower cost than what the user may currently have paid. The claims and/or prescription information may be obtained by the claims and policy API 240 shown in FIG. 2 and the data stored in the data lake 210. The claims and prescription information obtained from each of the insurers may be in different electronic formats and/or layouts. The claims and prescription information may be processed by the claims and parsing engine 320 to convert the claims and prescription information into the standard schema utilized by the CAAS 105. The claims and prescription information in the standard schema may be stored with the plan metadata 215.

The claims and prescription parsing engine 320 may be configured to use fuzzy matching techniques to map the claims and prescription information 310 to standardized claims and prescription descriptions before the claims and prescription information 310 is analyzed by the claims and prescription parsing engine 320. Medical providers may use inconsistent language to describe the procedures performed. One medical provider may describe the same procedure in a slightly different way than another provider. Furthermore, prescription drugs may be described under a brand name, a generic name, or other name. Such inconsistencies in the description of the procedures performed or prescriptions can make determining whether a particular policy covers a particular claim or prescription difficult. The set of standardized claim and prescription descriptions may provide a consistent set of descriptions that may be associated with claims and prescriptions. The claims and prescription parsing engine 320 may be configured to perform a probabilistic data match on the claims and prescription information 310 with the standardized claim and prescription descriptions. The claims and prescription parsing engine 320 may be configured to select a standardized description that is associated with the highest probability of being a match with the description of the procedure performed and/or other information included in the claims and/or prescriptions submitted to the insurer on behalf of a user.

The standardized description matched with a claim or prescription may be stored with the claim and prescription information in the plan metadata 215 associated with the claim. The standardized description may also be used by the CAAS 105 to determine whether the user has a policy that is likely to cover the claim. The policy information may also be used by the CAAS 105 to make recommendations to the user regarding costs associated with out-of-network providers, and/or no cost or low-cost preventive coverage options, such as but not limited to periodic physical health examinations, periodic dental examinations and cleanings, and discounts of health club memberships. The prescription information may be used by the prescription purchasing recommendation engine 325 to match with standardized descriptions of prescription information obtained from the prescription cost information parsing engine 330. Mapping the claims and prescription information to standard descriptions provides the technical benefit of improving the predictions that are provided by the machine learning models used by the prescription purchasing recommendation engine 325. The machine learning models may be trained using training data that includes the same standard claim and/or prescription descriptions that will be used by the prescription purchasing recommendation engine 325 to make recommendations to the user for making better use of their benefits. Thus, the machine learning models are presented claims and prescription descriptions for analysis that utilizes descriptions consistent with the claims and prescription descriptions included in the training data used to train the models.

If the probability of the standardized description matching a particular claim or prescription is less than a predetermined threshold, the claims and prescription parsing engine 320 may flag the claim for additional processing. The user may be prompted to provide additional information that may be used to help disambiguate the claim or prescription and/or to request that a different description for the claim or prescription be provided. Standardizing the descriptions of the claims may increase the likelihood that the prescription purchasing recommendation engine 325 may correctly analyze the claims and prescription information and provide more accurate predictions for obtaining savings on those prescriptions.

The prescription benefits manager unit 340 may be configured to analyze the standardized prescriptions information received from the claims and prescription parsing engine 320 and obtain substantially real-time prescription pricing information from the Prescription Benefit Managers (PBMs) via the third-party data API 280. The price of prescription drugs may change rapidly based on numerous factors, such as but not limited to the consumer's insurance plan, the pharmacy from which the consumer obtains the prescription, whether the drug is a generic or name-brand medication, when the purchase is being made, and other factors may impact the cost of prescription drugs. The prescription purchasing recommendation engine 325 may provide price transparency for these prescriptions, which is typically does not exist for most consumers.

The prescription benefits manager unit 340 may obtain prescription pricing information from one or more selected PBMs for pharmacies offering the prescription drugs that have been prescribed to the user. The policy coverage information obtained from the policy parsing engine 315 may be used by the prescription purchasing recommendation engine 325 to determine the policies available to the user which may cover the cost all or part of the cost of the prescriptions.

The prescription information obtained from the prescription feed of the claims and prescription information 310 may include information indicating the name of the drug(s) prescribed, the dosage(s) prescribed, the form of the drug(s) prescribed (e.g., tablet or liquid), and/or other information. The prescription feed may also include information indicating that the user has had a claim for one or more prescriptions submitted by one or more pharmacies. The prescription information may include the drug(s) prescribed, the dosage prescribed, the form of the drug(s) prescribed (e.g., tablet or liquid). The prescription information may include the amount charged by the pharmacy as well as any copy or amounts not covered by the user's insurance.

The prescription benefits manager unit 340 may be configured to obtain pricing information from one or more PBMs based on the policy information obtained from the policy parsing engine 315. The policy coverage information may be used to determine, at least in part, the PBMs from which prescription pricing information is obtained and analyzed. Some insurers may be contracted with a particular PBM while others may be contracted with other PBMs. Furthermore, a PBM may have contracts with pharmacies that pay the pharmacies a drug dispensing fee and/or or administrative fees for filling prescriptions for insured customers of the PBM's payer clients. As a result, the prices at which pharmacies offer the prescription drug may vary based at least on differences in the contracts between the PBMs and the pharmacies. The prescription pricing information may be passed to the prescription purchasing recommendation engine 325 for analysis along with other information that the prescription purchasing recommendation engine 325 may use to provide prescription purchase recommendations to the user.

The prescription benefits manager unit 340 may query the one or more selected PBMs for prescription cost information based on the standardized prescription information obtained from the claims and prescription parsing engine 320. The prescription benefits manager unit 340 may limit the search for pharmacies to a geographical area associated with the user. The geographical information may be based on user demographic information and/or based on the location of the pharmacies where the user obtained their prescriptions. The prescription benefits manager unit 340 may also be configured to access a user setting that specifies a distance threshold from a current location of the user, a home location, work location, or other specified location to limit the search for pharmacies offering the prescription drug or drugs that have been prescribed to the user. In other implementations, the prescription purchasing recommendation engine 325 may be responsible for limiting the results presented to the user to a specific geographic location, and the prescription benefits manager unit 340 may obtain prescription cost information the PBMs associated with each of the policies identified in the policy information that provide prescription coverage.

The prescription cost information parsing engine 330 may be configured to convert the prescription cost information into the standard schema utilized by the CAAS 105. The prescription cost information in the standard schema may be stored with the plan metadata 215. The prescription cost information parsing engine 330 may be configured to use fuzzy matching techniques to map the descriptions provided in the prescription cost information to standardized claims and prescription descriptions before the claims and prescription information is analyzed by the prescription purchasing recommendation engine 325. The PBMs may each describe the prescription drugs in a slightly different manner. The prescription cost information parsing information parsing engine 330 can map this information to the standard schema to facilitate matching the prescription information from the prescription feed with the information obtained from the prescription benefits manager unit 340.

The prescription purchasing recommendation engine 325 analyze the information received from the policy parsing engine 315, the claims and prescription parsing engine 320, the prescription cost information parsing engine 330, and/or one or more third-party data providers 130 to provide recommendations to the user for obtaining lower cost prescription drugs from pharmacies within their geographical area. Some implementations may also provide recommendations for online prescription ordering services for ordering the prescription drugs where such online services are available. An example of the recommendations provided by the prescription purchasing recommendation engine 325 is shown in FIGS. 6A and 6B.

Figure 6B:
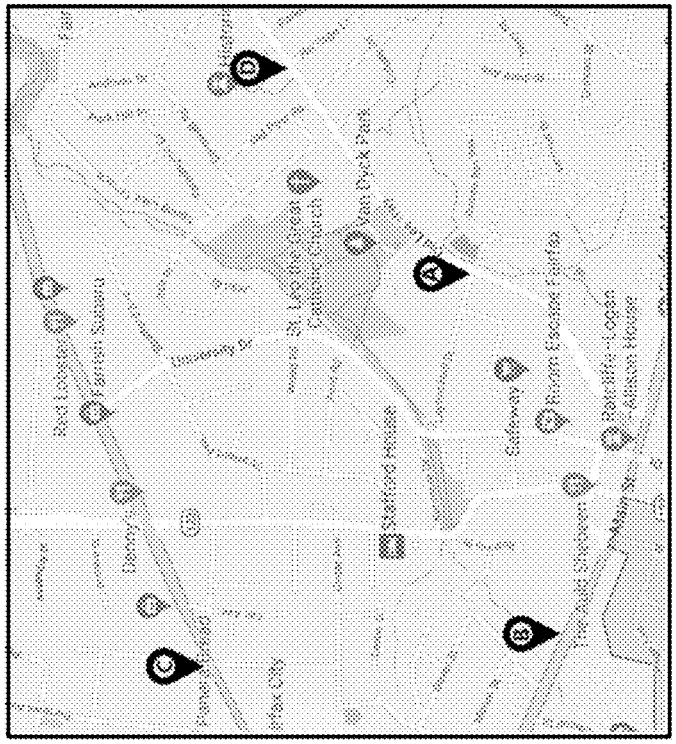

FIGS. 6A and 6B, described in detail below, provide an example of a user interface that may be provided to the CAAS 105. These examples in FIGS. 6A and 6B illustrate a various reports and reminders that may be generated by the prescription purchasing recommendation engine 325. These reports may assist the user in obtaining pricing information and for their prescription drugs including recommendations for pharmacies that offer the prescription drugs at lower cost.

Figure 4:
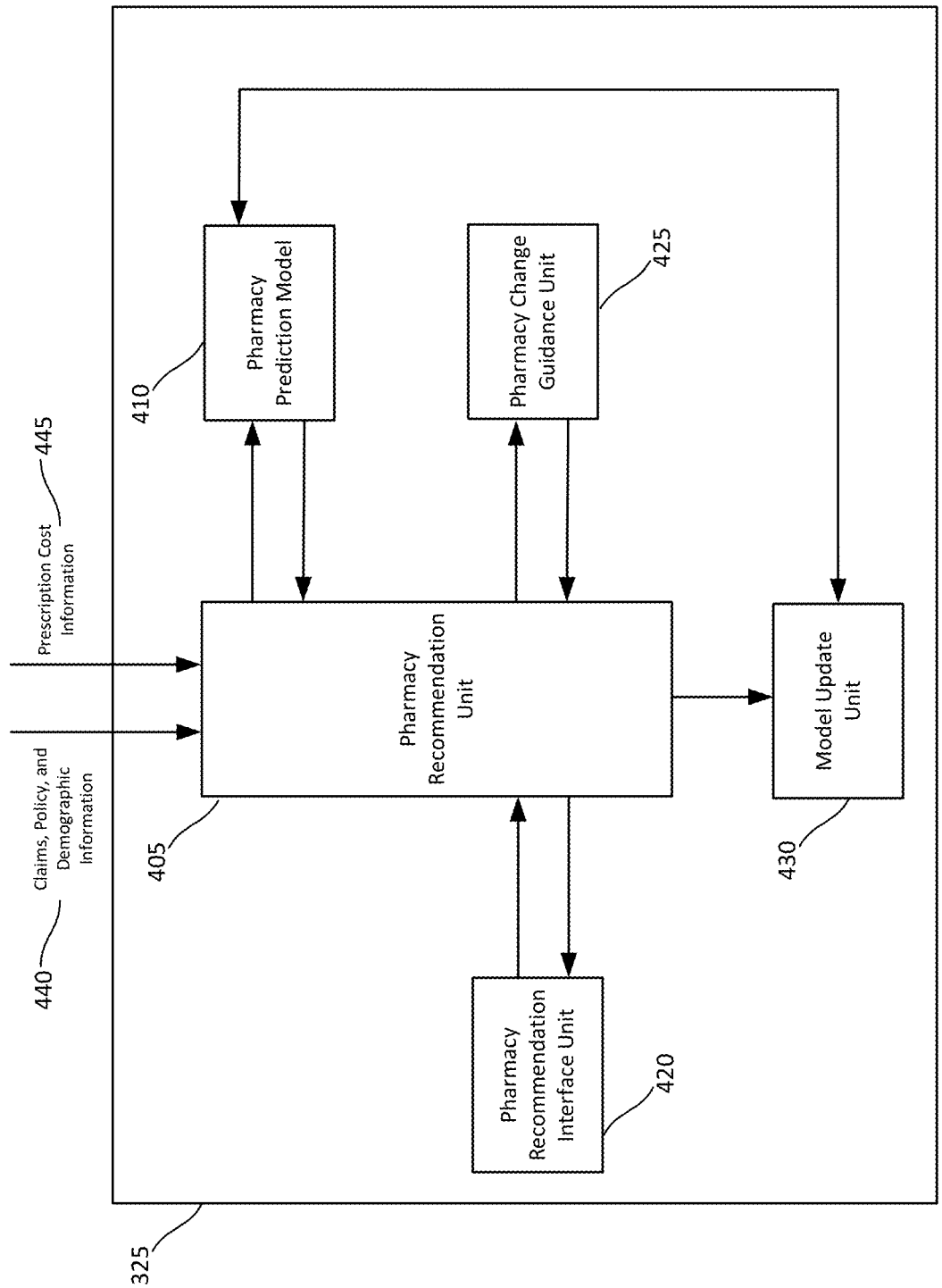
FIG. 4 is a diagram of an example architecture that shows additional details of the CAAS that may be used to implement the CAAS shown in FIGS. 1-3.

FIG. 4 is a diagram showing an example implementation of the prescription purchasing recommendation engine 325 of the CAAS 105. The prescription purchasing recommendation engine 325 may include a pharmacy recommendation unit 405, a pharmacy prediction model 410, a pharmacy change guidance unit 425, a pharmacy recommendation interface unit 420, and a model update unit 430. Other implementations may have a different configuration with a different number of machine learning models configured to support the recommendations for assisting the user in utilizing their benefits and insurance.

The prescription purchasing recommendation engine 325 may analyze user data from the various sources discussed above in order to obtain recommendations for assisting the user in saving on their prescription drugs. A recommendation may be generated on demand in response to a request from the user or automatically by the CAAS 105. The CAAS 105 may be configured to analyze the user data and generate the recommendations according to a schedule or in response to certain events.

The pharmacy recommendation unit 405 may be configured to obtain claims, policy, and user demographic information 440 to be analyzed to provide various recommendations to the user for utilizing their pharmacy benefits to obtain their prescription drugs at a lower cost. The claims, policy, and demographic information 440 includes the standardized policy coverage information output by the policy parsing engine 315. The claims and policy information 440 may also include the claims and prescription information into the standard schema output by the claims and parsing engine 320. The pharmacy recommendation unit 405 may also obtain standardized prescription cost information 445 from the prescription cost information parsing engine 330. The standardized prescription cost information 445 may include the cost of one or more prescriptions that have been prescribed to the user. The standardized prescription cost information 445 may include information that identifies the PBM and the cost of the prescription drug at one or more pharmacies contracted with the PBM to provide the prescription drug.

The prescription purchasing recommendation engine 325 may utilize the pharmacy prediction model 410 to analyze the claims, policy, and user demographic information 440 and the prescription cost information 440. The pharmacy prediction model 410 may be configured to analyze the policy information, the prescription information for the one or more prescriptions prescribed by the user, the prescription cost information from the PBMs, and the user's location to generate prescription pricing predictions for the user's prescriptions. The pharmacy prediction model 410 may analyze the policy information to correlate the prices of the prescription drugs prescribed to the user to one or more PBMs contracted by the insurers that include the prescription drugs prescribed to the user on the PBM's formulary, to identify one or more pharmacies proximate to the user's location contracted with the PBMs that offer the prescription drugs, and to rank the pharmacies based at least on the price at which the user may obtain the prescription drugs from the pharmacy and location of the pharmacy. The pharmacy prediction model 410 may be configured to identify pharmacies located within a predetermined distance of the user. The user's location may be based on the demographic data, and the pharmacy prediction model 410 may identify pharmacies proximate to their home and/or office. The predictions may be based on a single prescription for the user and provide a prediction of pharmacies near the user where the user may be able to obtain their prescription at a lower cost.

The predictions may also be based on a bundle of prescriptions where the user has multiple prescriptions. The bundle of prescriptions may include all or a subset of the user's prescriptions, and the pharmacy prediction model 410 may group the prescriptions into multiple bundles based on the costs of the bundle of prescriptions and/or the proximity of the pharmacy to a location associated with the user.

The prescription purchasing recommendation engine 325 may provide the predictions to the pharmacy recommendation interface unit 420. The pharmacy recommendation interface unit 420 may use the predictions to generate the prescription savings opportunity report shown in the user interface 610 shown in FIG. 6B. The report may present a list of nearby pharmacies from which the user may obtain their prescription or a bundle of prescriptions. The user interface 610 may include a "Next" button that the user may click on to advance to a report for a next prescription or bundle of prescriptions. The user interface 610 may include a button, link, or other means for indicating that the user would like to switch their prescription or bundle of prescriptions to a selected pharmacy. The selected pharmacy information may be provided to the pharmacy change guidance unit 425, which may present a user interface that may guide the user through the process of switching their prescription or prescriptions to a selected pharmacy.

The model update unit 430 may be configured to provide feedback to the pharmacy prediction model 410 to refine the training of the model. The model update unit 430 may receive feedback directly from the user and/or from the plan recommendation unit 405. Feedback from the user may be obtained from the plan recommendation unit 405 in response to the user indicating that a pharmacy did not have the prescription available at the suggested price or another pharmacy had the prescription drug available at a lower price at a pharmacy located proximate to the user. The feedback may be used to further refine the clustering predicted by the pharmacy prediction model 410.

FIGS. 6A and 6B are diagrams showing an example user interfaces of the CAAS 105 for presenting. The user interfaces shown in FIGS. 6A and 6B may be rendered by a browser application or a native application installed on a client device, such as the client devices 115a-115c shown in FIG. 1. The CAAS 105 may be configured to provide content renderable by a web browser installed on the client device. The CAAS 105 may also be configured to provide content to a native application installed on the client device which is configured to render the content received from the CAAS 105, to allow a user to interact with the content, and to receive requests for data and/or to perform various operations on the data maintained by the CAAS 105.

FIG. 6A is a diagram of an insurance dashboard user interface 605. The insurance dashboard user interface 605 may be implemented by the proactive benefits engagement unit 270 of the insights layer 290 of the CAAS 105. The insurance dashboard user interface 605 includes a notification pane 625, benefits details pane(s) 630, and a spending overview pane 635. The spending overview pane 635 provides a summary of how much medical, dental, and pharmacy spending for the user so far for the year or other period of time. The example implementation of the insurance dashboard user interface 605 shown in FIG. 6A shows one possible implementation of such an interface. Other implementations may present additional information to the user instead of or in addition to the information provided in this example.

The benefits details pane(s) 630 provide suggestions for benefits that the insured may wish to take advantage of save money on their health care, to take advantage of discounts that the user in entitled to under one or more of their insurance policies, and/or free benefits to which the user is entitled under one or more of their insurance policies. The benefit details pane(s) 630 may be populated by alerts generated by the prescription purchasing recommendation engine 325. The user may click on or otherwise activate the "Save Now" button in a pane to launch a user interface that provides details of the particular alert. Alternatively, the user may click on or otherwise activate the "Browse" button to browse through the alerts.

FIG. 6B is a diagram of a user interface 610 that presents a prescription savings opportunity report that may be present information to the user providing information how the user may be able to save money on their prescriptions. The user interface 610 may include a list of pharmacies that provide the user's prescription for a lower price than the user is currently paying. The user interface 610 may include a map that plots the locations of the suggested pharmacies. The user may select one of the pharmacies to obtain guidance for switching their prescription to the selected pharmacy. In some implementation, the prescription savings opportunity report may provide a listing of pharmacies for associated with one of the prescriptions that the user has been prescribed.

Figure 7:
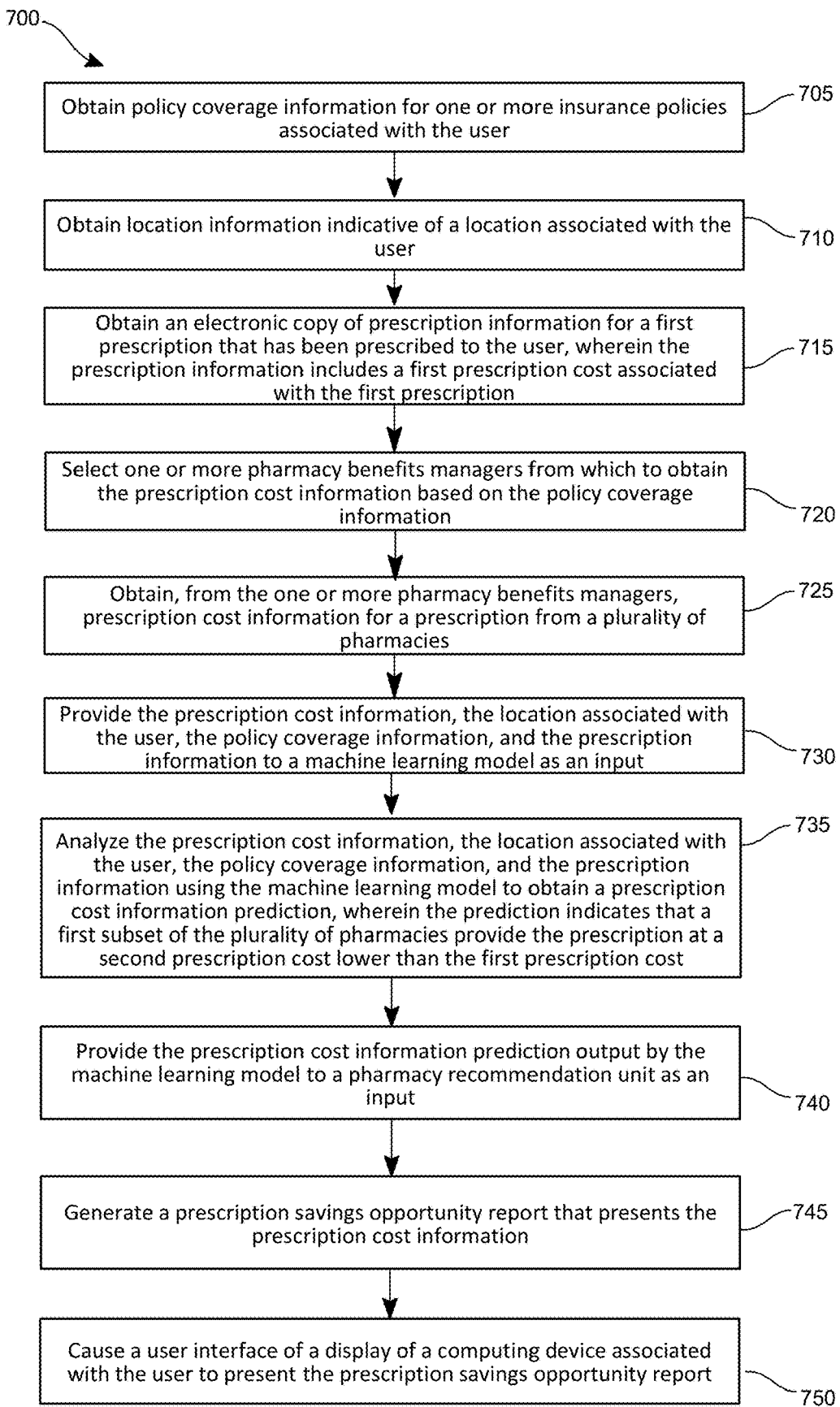
FIG. 7 is a flow chart of an example process for obtaining cost savings on prescription drugs.

FIG. 7 a flow chart of an example process 700 for machine-learning driven price guidance. The process 700 may be implemented by the CAAS 105 discussed in the preceding examples and may be used for recommending a pharmacy for saving on a prescription drug.

The process 700 may include an operation 705 of obtaining policy coverage information for one or more insurance policies associated with the user. The policy coverage information may be obtained from the information output by the policy parsing engine 315.

The process 700 may include an operation 710 of obtaining location information indicative of a location associated with a user. The location information may be obtained from the demographic information associated with the user. The information may be obtained from the census data 220 which include demographic information and other information associated with users.

The process 700 may include an operation 715 of obtaining an electronic copy of prescription information for a first prescription that has been prescribed to the user, wherein the prescription information includes a first prescription cost associated with the first prescription. The prescription information may be obtained from the claims and prescription parsing engine 320 and/or from the plan metadata 215.

The process 700 may include an operation 720 of selecting one or more pharmacy benefit manager from which to obtain prescription cost information based on the policy coverage information and an operation 725 of obtaining, from the one or more pharmacy benefits managers, prescription cost information for a prescription from a plurality of pharmacies. The prescription purchasing recommendation engine 325 may be configured to obtain the pricing information from the prescription cost information parsing engine 330.

The process 700 may include an operation 730 the prescription cost information, the location associated with the user, the policy coverage information, and the prescription information to a machine learning model as an input.

The process 700 may include an operation 735 of analyzing the prescription cost information, the location associated with the user, the policy coverage information, and the prescription information using the machine learning model to obtain a prescription cost information prediction, wherein the prediction indicates that a first subset of the plurality of pharmacies provide the prescription at a second prescription cost lower than the first prescription cost. The pharmacy prediction model 410 of the prescription purchasing recommendation engine 325 may analyze the data using one or more machine learning models to generate the predictions for pharmacy cost savings. The engine may also take into account insurance information and/or other discount plans to which the user may have access.

The process 700 may include an operation 740 of providing the prescription cost information prediction output by the machine learning model to a pharmacy recommendation unit as an input, and an operation 745 of generating a prescription savings opportunity report that presents the prescription cost information. The report may provide information for one or more pharmacies which may offer a prescription or bundle of prescriptions to the user for a lower cost. The user may be presented with a cost savings for a bundle of prescriptions so that the user may select a pharmacy where they can save overall for a set of prescriptions without having to visit multiple pharmacies.

The process 700 may include an operation 750 of causing a user interface of a display of a computing device associated with the user to present the prescription savings opportunity report. The pharmacy recommendation interface unit 420 may cause the user's client device 115 to display the benefits usage summary recommendation report. As discussed in the preceding examples, the user may interact with the CAAS 105 via a native application associated with the CAAS 105 on the client device 115 or via a web browser on the client device 115. The user interface 610 shown in FIG. 6B is an example of a prescription savings opportunity report that may be presented by the CAAS 105.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
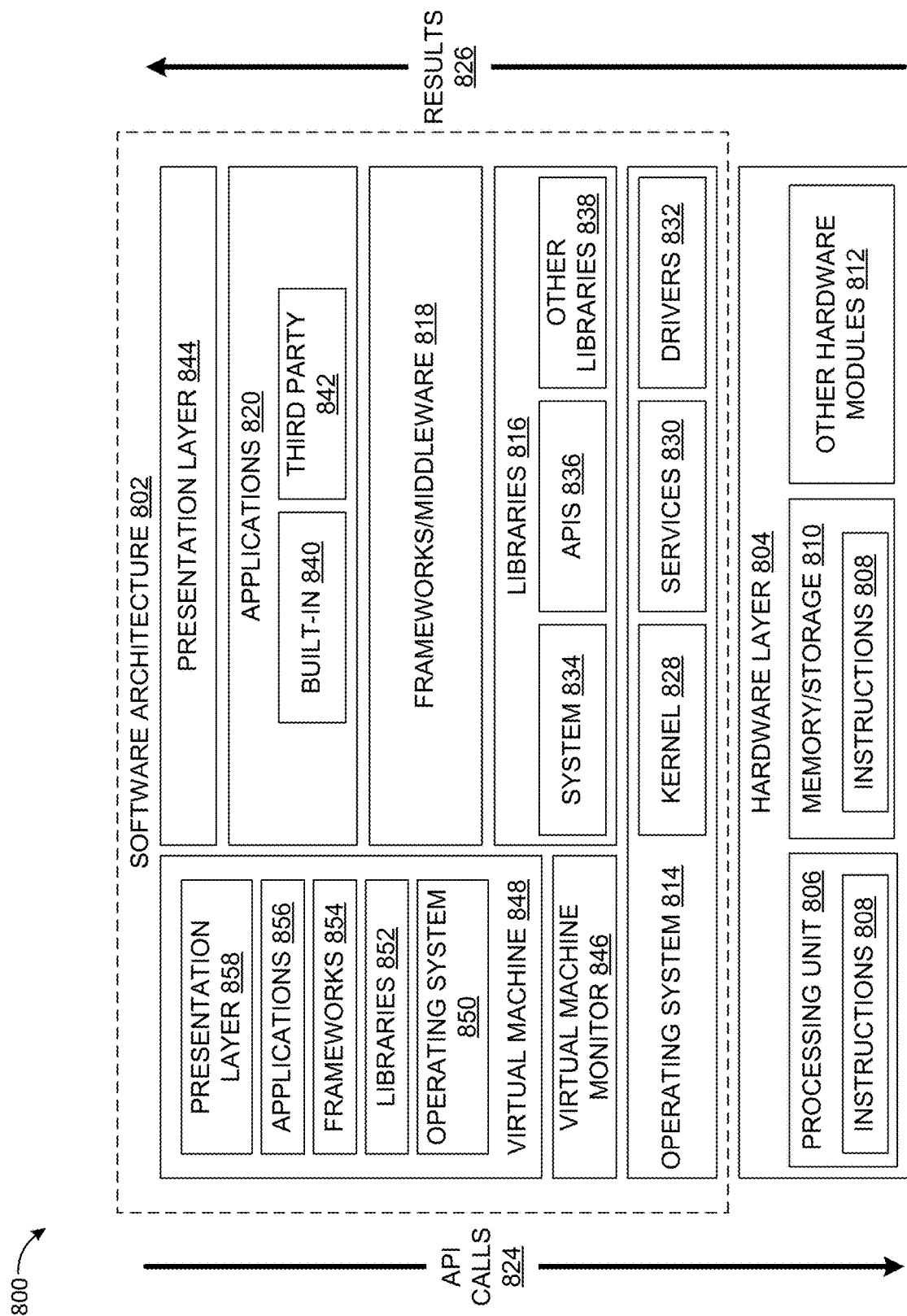
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
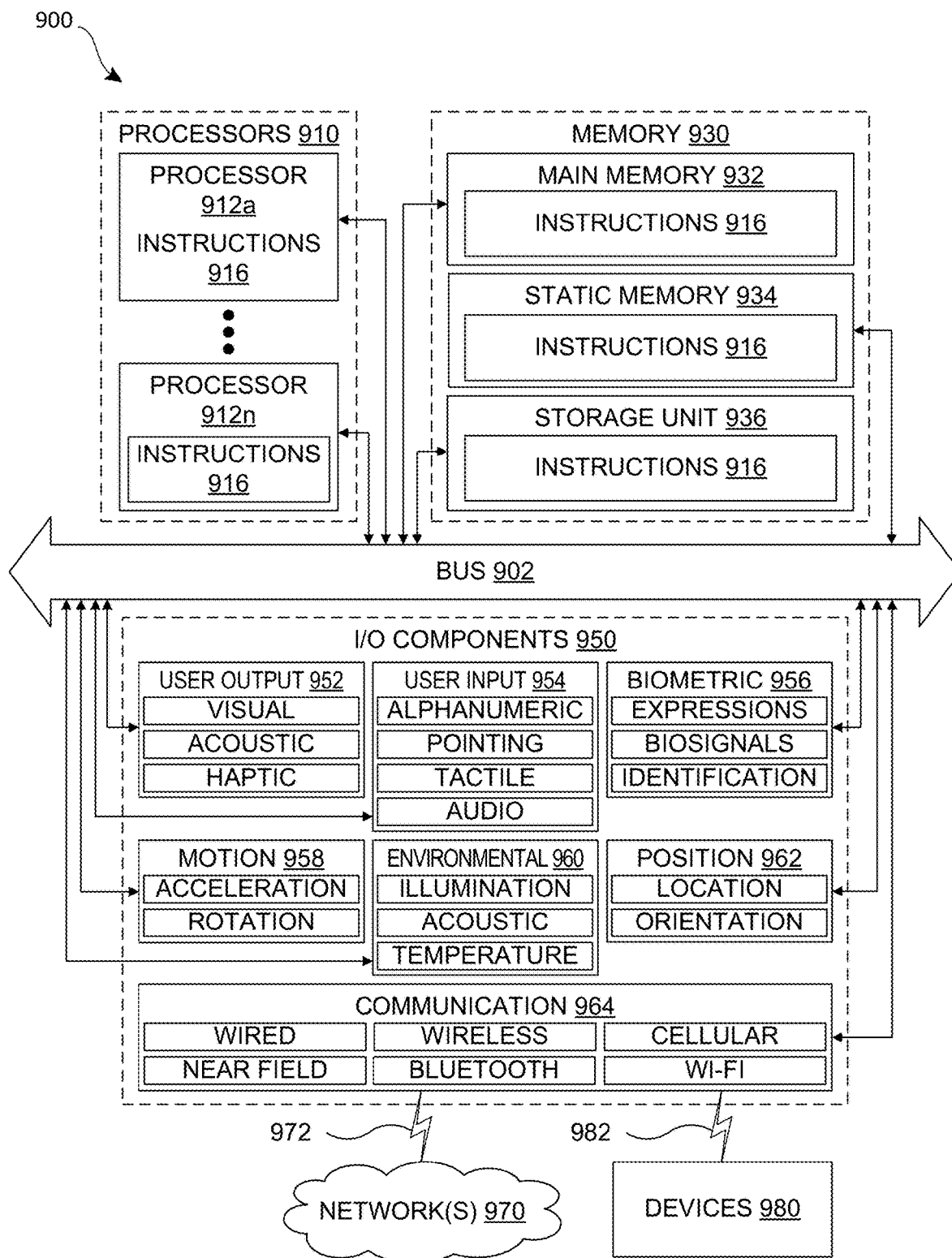
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations comprising:
receiving, via an insurance portal, a prescription purchasing recommendation request from a computing device associated with a user, wherein the insurance portal is configured on a virtual machine that is configured on at least one physical server and supports an authentication pipeline with the computing device for access control, wherein the authentication pipeline provides two-factor authentication, and the at least one physical server connects with the computing device via a network;
obtaining current policy coverage information of a plurality of insurance policies issued by different insurance providers to the user, wherein the insurance policies provide different prescription coverages;
obtaining location information indicative of a location associated with the user;
based on the prescription purchasing recommendation request, obtaining an electronic copy of prescription information for prescriptions that have been prescribed to the user;
converting the prescription information from a first format to a second format, wherein the second format is associated with a standard schema for processing prescription information;
selecting one or more pharmacy benefits managers from which to obtain current prescription cost information for the prescriptions based on the policy coverage information;
obtaining, from the one or more pharmacy benefits managers, the prescription cost information based on the different prescription coverages for the prescriptions from a plurality of pharmacies;

converting the prescription cost information from a third format to a fourth format, wherein the fourth format is associated with the standard schema;

providing the prescription cost information, the location associated with the user, and the prescription information to a machine learning model as an input;

analyzing the prescription cost information, the location associated with the user, the policy coverage information, and the prescription information using the machine learning model to obtain a prescription cost information prediction in substantially real-time, the machine learning model being trained using training data formatted according to the standard schema to output the prescription cost information prediction, wherein the prescription cost information prediction identifies a first subset of pharmacies from the plurality of pharmacies proximate a location of the user and ranks the first subset of pharmacies based on the prescription cost information and pharmacy locations;

providing the prescription cost information prediction output by the machine learning model to a pharmacy recommendation unit as an input;

generating, using the pharmacy recommendation unit, a prescription savings opportunity report that presents the prescription cost information prediction; and causing a user interface of the computing device to present the prescription savings opportunity report in substantially real-time, wherein the machine learning model is configured to group the prescriptions into multiple bundles of one or more prescriptions based on costs of the prescriptions associated with the different prescription coverages and proximity of the pharmacies to a location of the user, wherein a separate prescription cost information is obtained for each of the multiple bundles.

2. The data processing system of claim 1, wherein the prescription savings opportunity report includes a map that displays a location of each pharmacy of the plurality of pharmacies.

3. The data processing system of claim 1, wherein the prescription savings opportunity report provides guidance for switching the prescriptions to a selected pharmacy from the first subset of pharmacies.

4. The data processing system of claim 1, wherein the machine-readable storage medium includes instructions configured to cause the processor to perform operations of:

obtaining electronic copies of the insurance policies associated with the user;

analyzing the electronic copies of the insurance policies to generate the policy coverage information for each of the insurance policies, wherein the insurance policies include one or more medical insurance policies, one or more dental insurance policies, one or more accident insurance policies, one or more disability insurance policies, one or more critical illness insurance policies, one or more auto insurance policies, one or more hospital indemnity insurances, or a combination thereof.

5. A method implemented in a data processing system for machine-learning driven price guidance, the method comprising:

receiving, via an insurance portal, a prescription purchasing recommendation request from a computing device associated with a user, wherein the insurance portal is configured on a virtual machine that is configured on at least one physical server and supports an authentication pipeline with the computing device for access control, wherein the authentication pipeline provides two-factor authentication, and the at least one physical server connects with the computing device via a network;

obtaining current policy coverage information of a plurality of insurance policies issued by different insurance providers to the user, wherein the insurance policies provide different prescription coverages;

obtaining location information indicative of a location associated with the user;

based on the prescription purchasing recommendation request, obtaining an electronic copy of prescription information for prescriptions that have been prescribed to the user;

converting the prescription information from a first format to a second format, wherein the second format is associated with a standard schema for processing prescription information;

selecting one or more pharmacy benefits managers from which to obtain current prescription cost information for the prescriptions based on the policy coverage information;

obtaining, from the one or more pharmacy benefits managers, the prescription cost information based on the different prescription coverages for the prescriptions from a plurality of pharmacies;

converting the prescription cost information from a third format to a fourth format, wherein the fourth format is associated with the standard schema;

providing the prescription cost information, the location associated with the user, and the prescription information to a machine learning model as an input;

analyzing the prescription cost information, the location associated with the user, the policy coverage information, and the prescription information using the machine learning model to obtain a prescription cost information prediction in substantially real-time, the machine learning model being trained using training data formatted according to the standard schema to output the prescription cost information prediction, wherein the prescription cost information prediction identifies a first subset of pharmacies from the plurality of pharmacies proximate a location of the user and ranks the first subset of pharmacies based on the prescription cost information and pharmacy locations;

providing the prescription cost information prediction output by the machine learning model to a pharmacy recommendation unit as an input;

generating, using the pharmacy recommendation unit, a prescription savings opportunity report that presents the prescription cost information prediction; and causing a user interface of the computing device to present the prescription savings opportunity report in substantially real-time, wherein the machine learning model is configured to group the prescriptions into multiple bundles of one or more prescriptions based on costs of the prescriptions associated with the different prescription coverages and proximity of the pharmacies to a location of the user, wherein a separate prescription cost information is obtained for each of the multiple bundles.

6. The method of claim 5, wherein causing the user interface of a computing device associated with the user to present the prescription savings opportunity report further comprises:

causing the user interface of the computing device to present a map that displays a location of each pharmacy of the first subset of pharmacies.

7. The method of claim 5, wherein the prescription savings opportunity report provides guidance for switching the prescriptions on to a selected pharmacy from the first subset of pharmacies.

8. The method of claim 5, further comprising:
obtaining electronic copies of the plurality of insurance policies associated with the user;
analyzing the electronic copies of the plurality of insurance policies to generate policy coverage information for each of the insurance policies; and
selecting the one or more pharmacy benefits manager from which to obtain the prescription cost information based on the policy coverage information.

9. A non-transitory machine-readable medium on which are stored instructions that, when executed, cause a processor of a programmable device to perform operations of:
receiving, via an insurance portal, a prescription purchasing recommendation request from a computing device associated with a user, wherein the insurance portal is configured on a virtual machine that is configured on at least one physical server and supports an authentication pipeline with the computing device for access control, wherein the authentication pipeline provides two-factor authentication, and the at least one physical server connects with the computing device via a network;
obtaining current policy coverage information of a plurality of insurance policies issued by different insurance providers to the user, wherein the insurance policies provide different prescription coverages;
obtaining location information indicative of a location associated with the user;
based on the prescription purchasing recommendation request, obtaining an electronic copy of prescription information for prescriptions that have been prescribed to the user;
converting the prescription information from a first format to a second format, wherein the second format is associated with a standard schema for processing prescription information;
selecting one or more pharmacy benefits managers from which to obtain current prescription cost information for the prescriptions based on the policy coverage information;
obtaining, from the one or more pharmacy benefits managers, the prescription cost information based on the different prescription coverages for the prescriptions from a plurality of pharmacies;
converting the prescription cost information from a third format to a fourth format, wherein the fourth format is associated with the standard schema;
providing the prescription cost information, the location associated with the user, and the prescription information to a machine learning model as an input;
analyzing the prescription cost information, the location associated with the user, the policy coverage information, and the prescription information using the machine learning model to obtain a prescription cost information prediction in substantially real-time, the machine learning model being trained using training data formatted according to the standard schema to output the prescription cost information prediction, wherein the prescription cost information prediction identifies a first subset of pharmacies from the plurality of pharmacies proximate a location of the user and ranks the first subset of pharmacies based on the prescription cost information and pharmacy locations;
providing the prescription cost information prediction output by the machine learning model to a pharmacy recommendation unit as an input;
generating, using the pharmacy recommendation unit, a prescription savings opportunity report that presents the prescription cost information prediction; and
causing a user interface of the computing device to present the prescription savings opportunity report in substantially real-time,
wherein the machine learning model is configured to group the prescriptions into multiple bundles of one or more prescriptions based on costs of the prescriptions associated with the different prescription coverages and proximity of the pharmacies to a location of the user,
wherein a separate prescription cost information is obtained for each of the multiple bundles.

10. The non-transitory machine-readable medium of claim 9, wherein the prescription savings opportunity report includes a map that displays a location of each pharmacy of the first subset pharmacies.

11. The non-transitory machine-readable medium of claim 9, wherein the prescription savings opportunity report provides guidance for switching the prescriptions to a selected pharmacy from the first subset of pharmacies.

* * * * *